United States Patent
Kang

(10) Patent No.: US 9,977,610 B2
(45) Date of Patent: May 22, 2018

(54) DATA STORAGE DEVICE TO SWAP ADDRESSES AND OPERATING METHOD THEREOF

(71) Applicant: Nam Wook Kang, Hwaseong-si (KR)

(72) Inventor: Nam Wook Kang, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 91 days.

(21) Appl. No.: 15/083,477

(22) Filed: Mar. 29, 2016

(65) Prior Publication Data

US 2016/0371019 A1 Dec. 22, 2016

(30) Foreign Application Priority Data

Jun. 22, 2015 (KR) .................. 10-2015-0088469

(51) Int. Cl.
*G06F 3/06* (2006.01)
*G06F 12/1009* (2016.01)

(52) U.S. Cl.
CPC ............ *G06F 3/0616* (2013.01); *G06F 3/064* (2013.01); *G06F 3/0679* (2013.01); *G06F 12/1009* (2013.01); *G06F 2212/1032* (2013.01); *G06F 2212/2022* (2013.01); *G06F 2212/222* (2013.01)

(58) Field of Classification Search
None
See application file for complete search history.

(56) References Cited

U.S. PATENT DOCUMENTS

| | | | |
|---|---|---|---|
| 6,000,006 A * | 12/1999 | Bruce | G06F 11/1068 711/103 |
| 8,171,204 B2 | 5/2012 | Chow et al. | |
| 8,392,647 B2 | 3/2013 | Lee et al. | |
| 8,601,202 B1 | 12/2013 | Melcher et al. | |
| 8,745,357 B2 | 6/2014 | Tucek et al. | |
| 9,633,233 B2 * | 4/2017 | Wu | G06F 21/79 |
| 9,678,863 B2 * | 6/2017 | Talagala | G06F 12/0246 |
| 2008/0307192 A1 | 12/2008 | Sinclair et al. | |
| 2009/0157947 A1 * | 6/2009 | Lin | G06F 12/0246 711/103 |
| 2009/0271562 A1 | 10/2009 | Sinclair | |
| 2010/0023800 A1 * | 1/2010 | Harari | G06F 11/1068 714/2 |

(Continued)

FOREIGN PATENT DOCUMENTS

KR 0845137 7/2008
KR 1155566 6/2012

*Primary Examiner* — Kevin Verbrugge
(74) *Attorney, Agent, or Firm* — Volentine, Whitt & Francos, PLLC

(57) ABSTRACT

A data storage device includes a first multi-chip set which includes a first volatile memory, a first non-volatile memory, and a first core configured to control the first volatile memory and the first non-volatile memory, a second multi-chip set which includes a second volatile memory, a second non-volatile memory, and a second core configured to control the second volatile memory and the second non-volatile memory. A controller is connected to the first multi-chip set and the second multi-chip set and configured to swap a first logical address of a first storage region of the first non-volatile memory with a second logical address of a second storage region of the second non-volatile memory.

23 Claims, 18 Drawing Sheets

(56) References Cited

U.S. PATENT DOCUMENTS

| | | | |
|---|---|---|---|
| 2010/0174845 A1* | 7/2010 | Gorobets | G06F 12/0246 711/103 |
| 2011/0040924 A1* | 2/2011 | Selinger | G06F 11/10 711/103 |
| 2011/0041005 A1* | 2/2011 | Selinger | G06F 11/10 714/719 |
| 2011/0041039 A1* | 2/2011 | Harari | G06F 11/1068 714/773 |
| 2011/0161554 A1* | 6/2011 | Selinger | G06F 13/1668 711/103 |
| 2011/0161784 A1* | 6/2011 | Selinger | G06F 11/1068 714/768 |
| 2011/0238892 A1* | 9/2011 | Tsai | G11C 16/349 711/103 |
| 2012/0079232 A1* | 3/2012 | Hinton | G06F 12/0292 711/207 |
| 2013/0054878 A1* | 2/2013 | Lee | G06F 12/0246 711/103 |
| 2013/0326148 A1* | 12/2013 | Fang | G06F 12/0246 711/133 |
| 2014/0143474 A1* | 5/2014 | Damle | G06F 12/0246 711/103 |
| 2014/0173178 A1 | 6/2014 | Schwartz | |
| 2014/0189211 A1 | 7/2014 | George et al. | |
| 2014/0215125 A1 | 7/2014 | Sela et al. | |
| 2015/0067232 A1* | 3/2015 | Fontana | G06F 12/0246 711/103 |
| 2015/0095546 A1* | 4/2015 | Bennett | G06F 12/0246 711/5 |
| 2015/0149728 A1* | 5/2015 | Moon | G06F 12/0868 711/133 |
| 2015/0324119 A1* | 11/2015 | Romanovsky | G06F 12/08 711/103 |
| 2015/0324120 A1* | 11/2015 | Wu | G06F 3/065 711/103 |
| 2015/0324132 A1* | 11/2015 | Chen | G06F 3/0611 711/159 |
| 2015/0324137 A1* | 11/2015 | Wu | G06F 3/0619 713/2 |
| 2016/0062683 A1* | 3/2016 | Fontana | G06F 12/0246 711/103 |
| 2016/0117260 A1* | 4/2016 | Wu | G06F 21/79 713/193 |
| 2016/0267014 A1* | 9/2016 | Doi | G11C 13/0023 |
| 2017/0286293 A1* | 10/2017 | Gayman | G06F 12/0646 |

* cited by examiner

FIG. 11

| TABLE1 | TB1 |
|---|---|
| Source Global/Local Logical Address | Destination Global/Local Logical Address |
| 0/1LPN0 | 201/2LPN100 |
| ⋮ | ⋮ |

FIG. 12

| | TABLE2 TB2 |
|---|---|
| | Physical Address |
| GLPN0 ↔ 1LPN0 | 1PPN0 ⎫ |
| GLPN2 ↔ 1LPN1 | 1PPN1 ⎬ PA101 |
| GLPN4 ↔ 1LPN2 | 1PPN2 |
| | ⋮ ⎭ |
| GLPN200 ↔ 1LPN100 | 1PPN100 ⎫ |
| GLPN202 ↔ 1LPN101 | 1PPN101 ⎬ PA103 |
| GLPN204 ↔ 1LPN102 | 1PPN102 |
| | ⋮ ⎭ |

| | TABLE3 TB3 |
|---|---|
| | Physical Address |
| GLPN1 ↔ 2LPN0 | 2PPN0 ⎫ |
| GLPN3 ↔ 2LPN1 | 2PPN1 ⎬ PA201 |
| GLPN5 ↔ 2LPN2 | 2PPN2 |
| | ⋮ ⎭ |
| GLPN201 ↔ 2LPN100 | 2PPN100 ⎫ |
| GLPN203 ↔ 2LPN101 | 2PPN101 ⎬ PA203 |
| GLPN205 ↔ 2LPN102 | 2PPN102 |
| | ⋮ ⎭ |

FIG. 14

| TABLE1 | TB4 |
|---|---|
| Source Global/Local Logical Address | Destination Global/Local Logical Address |
| 0/1LPN0 | 203/2LPN101 |
| ⋮ | ⋮ |

DATA STORAGE DEVICE TO SWAP ADDRESSES AND OPERATING METHOD THEREOF

CROSS-REFERENCE TO RELATED APPLICATION

This application claims priority under 35 U.S.C. § 119(a) from Korean Patent Application No. 10-2015-0088469 filed on Jun. 22, 2015, the disclosure of which is hereby incorporated by reference in its entirety.

BACKGROUND

Embodiments of the present inventive concept relate to a data storage device, and more particularly, to a data storage device which can change a logical address of a source region to a logical address of a destination region using a swap mapping table so as to control durability and performance of the data storage device, and a data processing system including the same.

A memory device is used to store data, and types of memory devices may be divided into volatile memory devices and non-volatile memory devices. A flash memory device is a non-volatile memory device and an example of an electrically erasable programmable read-only memory (EEPROM) in which a plurality of memory cells are erased or programmed by a one-time operation. For example, programming or reading is performed by page, and erasing is performed by block. A block may include a plurality of pages.

A flash memory device may include a plurality of flash memory chips. Overall durability (or lifetime) and performance of the flash memory device may be determined according to one of the plurality of flash memory chips. For example, when one of the plurality of flash memory chips is worn-out or is lowered in performance, the overall durability and performance of the flash memory device including the plurality of flash memory chips may be lowered.

SUMMARY

An example embodiment of the present inventive concept is directed to a data storage device, including a first multi-chip set which includes a first volatile memory, a first non-volatile memory, and a first core configured to control the first volatile memory and the first non-volatile memory, a second multi-chip set which includes a second volatile memory, a second non-volatile memory, and a second core configured to control the second volatile memory and the second non-volatile memory, and a controller connected to the first multi-chip set and the second multi-chip set and configured to swap a first logical address of a first storage region of the first non-volatile memory with a second logical address of a second storage region of the second non-volatile memory. The controller is configured to swap first data stored in the first storage region with second data stored in the second storage region.

The data storage device further includes a memory configured to store a table including the first logical address and the second logical address that are swapped with each other by the controller. The controller is configured to receive the first logical address from a host, and transmit the swapped second logical address to the second multi-chip set with reference to the table.

According to some exemplary embodiments, the first storage region is a region for storing user data, and the second storage region is an over-provisioning region.

A wear count for the first storage region is higher than a wear count for the second storage region. The wear count may be based upon an erase count, a program count, a read count, a bad block occurrence number, and/or a read error occurrence number.

According to some exemplary embodiments, the first storage region is a region for storing one of hot data and cold data, and the second storage region is a region for storing the other of the hot data and the cold data.

According to some exemplary embodiments, the first volatile memory and the first core are included in a first semiconductor package, and the second volatile memory and the second core are included in a second semiconductor package. According to some exemplary embodiments, the first multi-chip set and the controller are embodied in one semiconductor package. The semiconductor package is an embedded package on package (ePOP).

The first logical address is transmitted to the controller from the first core through a first channel according to a first request of the controller, and the second logical address is transmitted to the controller from the second core through a second channel according to a second request of the controller.

According to some exemplary embodiments, the first core is configured to first compare a wear count of each of storage regions included in the first non-volatile memory with a reference wear count according to the first request, and transmit the first logical address of the first storage region to the controller through the first channel according to a result of the first comparison. The second core is configured to second compare a wear count of each of storage regions included in the second non-volatile memory with the reference wear count, transmit the second logical address of the second storage region to the controller through the second channel according to a result of the second comparison, and wherein a first wear count for the first storage region is larger than a second wear count for the second storage region.

According to some exemplary embodiments, the first core is configured to first compare a wear count of each of storage regions included in the first non-volatile memory device with a reference wear count, and transmit the first logical address of the first storage region to the controller through a first channel according to a result of the first comparison. The second core is configured to compare a wear count of each of storage regions included in the second non-volatile memory with the reference wear count, and transmit the second logical address of the second storage region to the controller through a second channel according to a result of the second comparison. A first wear count of the first storage region is larger than a second wear count of the second storage region. Each of the first storage region and the second storage region is a block or a page.

Each of the first volatile memory and the second volatile memory may be a dynamic random access memory (DRAM), each of the first non-volatile memory and the second non-volatile memory may be a flash memory, and the data storage device may be a solid state drive (SSD).

An example embodiment of the present inventive concept is directed to a data processing system, including a host and a data storage device connected to the host. The data storage device includes a first multi-chip set which includes a first volatile memory, a first non-volatile memory, and a first core configured to control the first volatile memory and the first non-volatile memory, a second multi-chip set which includes a second volatile memory, a second non-volatile memory, and a second core configured to control the second volatile memory and the second non-volatile memory, and a controller connected to the first multi-chip set and the second multi-chip set and configured to swap a first logical address of a first storage region of the first non-volatile memory with a second logical address of a second storage region of the second non-volatile memory. The controller is configured to swap first data stored in the first storage region with second data stored in the second storage region.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 11 is an exemplary embodiment of a swap mapping table for the logical address swap operation;

FIG. 12 is a conceptual diagram which illustrates a relationship among a logical address, a physical address, and a global logical address;

FIG. 14 is another exemplary embodiment of the swap mapping table for the logical address swap operation;

DETAILED DESCRIPTION OF THE EMBODIMENTS

Figure 1:
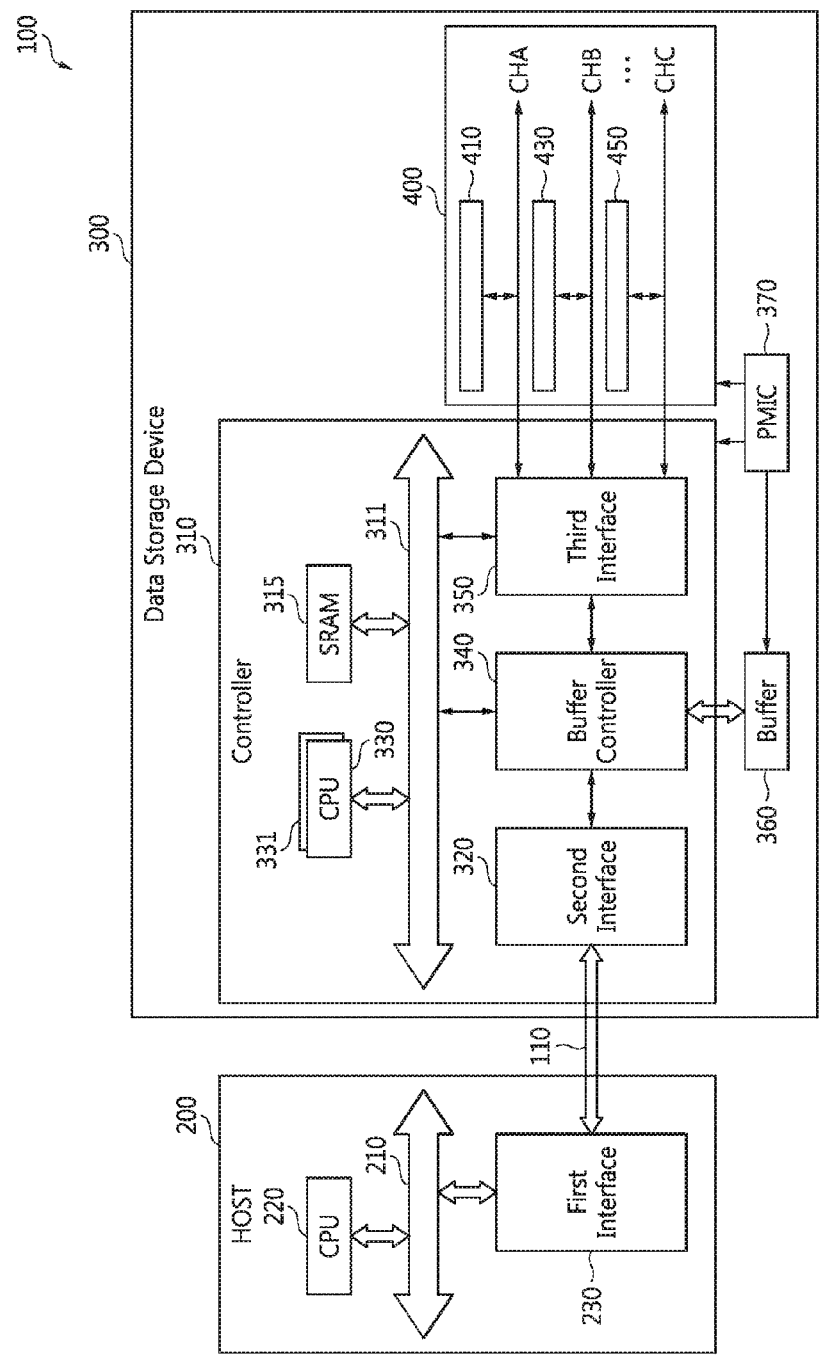
FIG. 1 is a block diagram which shows a data processing system according to some exemplary embodiments of the present inventive concept.

The present inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

A method of increasing data processing capability of a data storage device, e.g., data server, includes a scale-up and a scale-out. The scale-up improves data processing capability of the data server by increasing capacity of the data server itself and is also referred to as vertical scaling. The scale-out improves data processing capability of a system which includes the data server by increasing the number of data servers connected and is also referred to as horizontal scaling.

In a data storage device having the scale-up structure, when the number of non-volatile memory devices included in the data storage device is increased, loading capacitance of an interface embodied between a controller for controlling the non-volatile memory devices and the non-volatile memory devices may be increased. Accordingly, a data processing speed of the data storage device may be lowered. Therefore, a data storage device described in the present specification may be a data storage device having the scale-out structure.

A data storage device having a scale-out structure may change or swap a logical address or a global logical address using a scale-out storage device, a semiconductor chip included in the scale-out storage device, and/or a representative value (hereinafter, referred to as "wear-count") which can represent endurance of a block included in a memory cell array of the semiconductor chip.

For example, the wear-count may include an erase count which represents how many times a corresponding block is erased, a program count which represents how many times a corresponding block is programmed, a read count which represents how many times a corresponding block is read, a bad block occurrence number for a corresponding block, or a read error occurrence number for a corresponding block; however, the wear-count is not limited thereto. Here, the erase count may be understood as a concept which includes a program-erase (P/E) cycle.

Moreover, a scale-out storage device may include a volatile memory, at least one non-volatile memory, and a scale-out controller which controls the volatile memory and the at least one non-volatile memory. When each of the volatile memory, the at least one non-volatile memory, and the scale-out controller is embodied in a semiconductor chip or a semiconductor package, the scale-out storage device may be referred to as a multi-chip set. A scale-out controller may be a core.

FIG. 1 is a block diagram which shows a data processing system 100 according to some exemplary embodiments of the present inventive concept. Referring to FIG. 1, a data processing system 100 may include a host 200 and a data storage device 300 which can transmit or receive a command and/or data to or from the host 200 through an interface 110.

Figure 2:
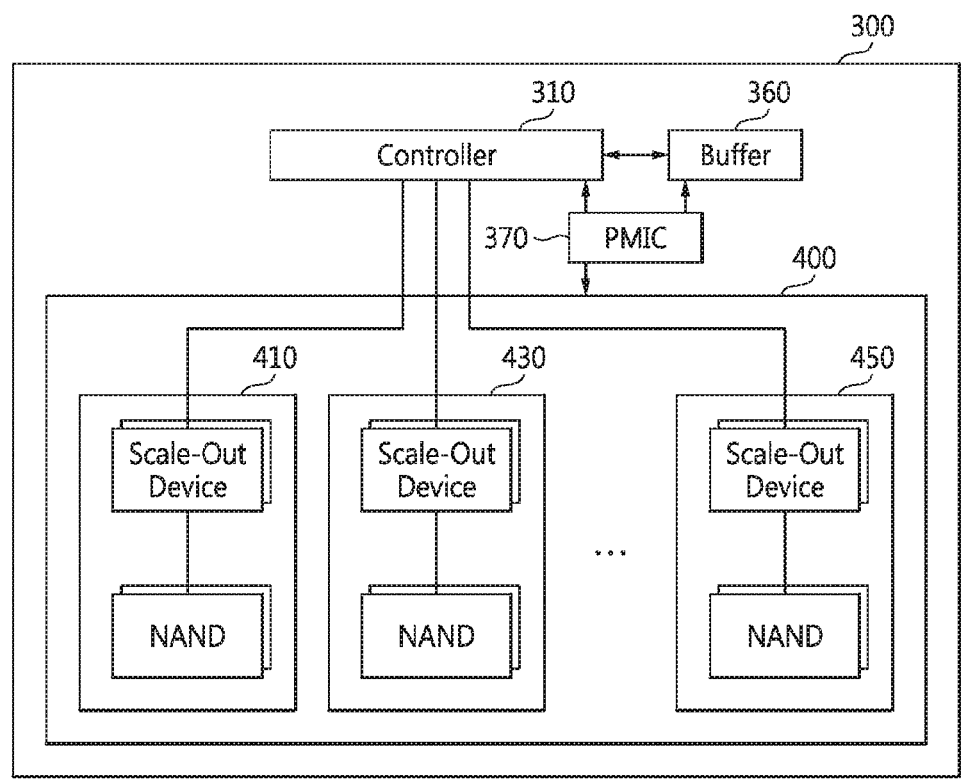
FIG. 2 is a detailed block diagram of a data storage device shown in FIG. 1.

When a structure of a memory cluster 400 included in the data storage device 300 has a structure exemplarily shown in FIG. 2, the data storage device 300 may be embodied as a scale-out structure. For example, the data processing system 100 may be a memory system; however, it is not limited thereto.

According to some exemplary embodiments, the data processing system 100 may be embodied as a personal computer (PC), a workstation, a data center, an internet data center (IDC), a storage area network (SAN), a network attached storage (NAS), or a mobile computing device; however, it is not limited thereto.

A mobile computing device including the memory cluster 400 may be embodied as a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book; however, it is not limited thereto.

The interface 110 may be embodied as a serial advanced technology attachment (SATA) interface, a SATA express (SATAe) interface, a serial attached small computer system interface (SCSI) interface, a peripheral component interconnect express (PCIe) interface, a non-volatile memory Express (NVMe) interface, an advanced host controller interface (AHCI) interface, or a multimedia card (MMC) interface; however, it is not limited thereto. According to some exemplary embodiments, the interface 110 may transmit electrical signals or optical signals.

The host 200 may control a data processing operation (for example, a write (or program) operation or a read operation) of the data storage device 300 through the interface 110. The host 200 may be a host controller.

The CPU 220 and the first interface 230 may transmit or receive data to or from each other through a bus architecture 210. Even though the host 200 including the bus architecture 210, the CPU 220, and the first interface 230 is shown in FIG. 1, a technical concept of the present inventive concept is not limited to the block diagram of the host 200 shown in FIG. 1.

According to some exemplary embodiments, the host 200 may be embodied as an integrated circuit (IC), a motherboard, a system on chip (SoC), an application processor (AP), a mobile AP, a web server, a data server, or a data base server; however, it is not limited thereto. For example, the bus architecture 210 may be embodied as an advanced microcontroller bus architecture (AMBA), an advanced high-performance bus (AHB), an advanced peripheral bus (APB), an advanced eXtensible interface (AXI), an advanced system bus (ASB), an AXI Coherency Extensions), or a combination of these; however, it is not limited thereto.

The CPU 220 may generate a write request for controlling a write operation of the data storage device 300 or a read request for controlling a read operation of the data storage device 300. The write request may include a write address (for example, a logical address), and the read request may include a read address (for example, a logical address). For example, the CPU 220 may include one or more cores. A request may be a command.

The first interface 230 may change a format of a command and/or data to be transmitted to the data storage device 300, and transmit the command having a changed format and/or the data having a changed format to the data storage device 300 through the interface 110.

Moreover, the first interface 230 may change a format of a response and/or data transmitted to the data storage device 300, and transmit the response having a changed format and/or the data having a changed format to the CPU 220 through the bus architecture 210. According to some exemplary embodiments, the first interface 230 may include a transceiver for transmitting or receiving a command and/or data. A structure and an operation of the first interface 230 may be embodied to be compatible with a structure and an operation of the interface 110.

The data storage device 300 may include a controller 310, a buffer 360, a power management IC (PMIC) 370, and the memory cluster 400. Here, the memory cluster 400 may be a set of memory devices. Moreover, the memory cluster 400 may include scale-out devices and memory devices as shown in FIG. 2.

The data storage device 300 may be embodied as a flash memory-based memory device; however, it is not limited thereto. For example, the data storage device 300 may be embodied as a solid-state drive or solid-state disk (SSD), an embedded SSD (eSSD), a universal flash storage (UFS), a multimedia card (MMC), an embedded MMC (eMMC), or a managed NAND; however, it is not limited thereto. For example, a flash memory-based memory device may be embodied as a NAND-type flash memory device or a NOR-type flash memory device.

The flash memory-based memory device may include a memory cell array. The memory cell array may include a plurality of memory cells. For example, the memory cell array may include a two-dimensional (2D) memory cell array or a three-dimensional (3D) memory cell array.

The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. A term of "monolithic" means that layers of each level are directly deposited on layers of each underlying level of the array. In an embodiment of the present inventive concept, the 3D memory array includes vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

According to some exemplary embodiments, the data storage device 300 may be embodied in a hard disk drive (HDD), a phase change RAM (PRAM) device, a magnetoresistive RAM (MRAM) device, a spin-transfer torque MRAM (STT-MRAM) device, a ferroelectric RAM (FRAM) device, or a resistive RAM (RRAM) device; however, it is not limited thereto.

The controller 310 may control transmission or processing of a command and/or data transmitted or received between the host 200, the buffer 360, and the memory cluster 400. According to some exemplary embodiments, the controller 310 may be embodied as an IC, a SoC, or a set of chips.

The controller 310 may include a bus architecture 311, an internal memory 315, a second interface 320, at least one CPU 330 and/or 331, a buffer controller 340, and a third interface 350.

The bus architecture 311 may be embodied as AMBA, AHB, APB, AXI, ASB, ACE, or a set of these; however, it is not limited thereto.

The internal memory 315 may store data for an operation of the controller 310 or data generated by a data processing operation (e.g., a write operation or a read operation) performed by the controller 310. For example, the internal memory 315 may store a first flash translation layer (FTL) code which can be performed by the CPU 330 and/or 331. The FTL code may be referred to as FTL. For example, when the data storage device 300 is booted, the first FTL code may be loaded to the internal memory 315 from the memory cluster 400, and the first FTL code may be performed by the CPU 330 and/or 331.

According to some exemplary embodiments, the internal memory 315 may be embodied as a random access memory (RAM), a dynamic RAM (DRAM), a static RAM (SRAM), a buffer, a buffer memory, a cache, or a tightly coupled memory (TCM); however, a type of the internal memory 315 is not limited thereto.

The second interface 320 may change a format of a response and/or data to be transmitted to the host 200, and transmit the response having a changed format and/or the data having a changed format to the host 200 through the interface 110. Moreover, the second interface 320 may receive a command and/or data transmitted from the host 200, change a format of a received command and/or received data, and transmit the command having a changed format and/or the data having a changed format to at least one CPU 330 and/or 331 and/or the buffer controller 340. According to an exemplary embodiment, the second interface 320 may include a transceiver for transmitting or receiving a signal and/or data.

A structure and an operation of the second interface 320 may be embodied to be compatible with the structure and the operation of the interface 110. For example, the second interface 320 may be embodied in a SATA interface, a SATAe interface, a SAS interface, a PCIe interface, a NVMe interface, an AHCI interface, a MMC interface, a NAND-type flash memory interface, or a NOR-type flash memory interface; however, it is not limited thereto.

One or more CPUs 330 and/or 331 may control the internal memory 315, the second interface 320, the buffer controller 340, and a third interface 350 through the bus architecture 311. Each of the CPUs 330 and 331 may include one or more cores. According to some exemplary embodiments, one or more CPUs 330 and/or 331 may control the PMIC 370.

For example, a first CPU 330 may transmit or receive data to or from the host 200 through the second interface 320. A second CPU 331 may transmit or receive data to or from the memory cluster 400 through the third interface 350. According to some exemplary embodiments, the first CPU 330 and the second CPU 331 may configure a multi-CPU. According to some exemplary embodiments, the first CPU 330 may control the second CPU 331; however, it is not limited thereto.

The CPU 330 and/or 331 may generate a swap mapping table for logical addresses to be swapped, and store the swap mapping table in the buffer 360 using the buffer controller 340.

The buffer controller 340 may write data (or swap mapping table) in the buffer 360 or read data (or swap mapping table) from the buffer 360 under the control of the first CPU 330 or the second CPU 331. The buffer controller 340 may be referred to as a controller or a buffer manager for controlling a write operation and a read operation for the buffer 360.

The third interface 350 may control data processing operations (for example, write operations or read operations) for the memory cluster 400 through a corresponding main channel among a plurality of main channels CHA, CHB, . . . , CHC according to a control of the first CPU 330 or the second CPU 331.

According to some exemplary embodiments, the third interface 350 may be embodied as a SATA interface, a SATAe interface, a SAS interface, a PCIe interface, an NVMe interface, an AHCI interface, a MMC interface, a NAND-type flash memory interface, or a NOR-type flash memory interface; however, it is not limited thereto.

For example, the third interface 350 may include an error correction code (ECC) engine (not shown). The ECC engine may correct an error included in data to be stored in the memory cluster 400 or data output from the memory cluster 400. According to some exemplary embodiments, the ECC engine may be embodied in any of the inside of the controller 310.

The buffer 360 may write data (or swap mapping table) or read data (or swap mapping table) according to a control of the buffer controller 340. According to some exemplary embodiments, the buffer 360 which can be embodied as a volatile memory device may be embodied as a buffer memory, a RAM, a SRAM, or a DRAM; however, it is not limited thereto.

The buffer 360 may include a first region which stores a mapping table for a logical address-physical address conversion for a plurality of clusters 410, 430, . . . , 450 and/or a swap mapping table, and a second region which performs a function of cache; however, it is not limited thereto.

For example, the first FTL code performed by the CPU 330 and/or 331 may perform a logical address-physical address conversion using the mapping table stored in the first region or may swap source logical addresses with destination logical addresses using the swap mapping table stored in the first region. For example, the mapping table and the swap mapping table may be embodied as one mapping table or different mapping tables.

According to some exemplary embodiments, when each of the controller 310 and the buffer 360 is embodied as a different semiconductor chip, the controller 310 and the buffer 360 may be embodied as one package, e.g., a package-on-package (PoP), a multi-chip package (MCP), or a system-in package (SiP); however, a type of the package is not limited thereto. For example, a first chip including the buffer 360 may be stacked above a second chip including the controller 310 through stack balls.

The PMIC 370 may control operational voltages supplied to the controller 310, the buffer 360, and/or the memory cluster 400. For example, a first operational voltage supplied to the controller 310, a second operational voltage supplied to the buffer 360, and a third operational voltage supplied to the memory cluster 400 may be the same as or different from each other.

The memory cluster 400 may include a plurality of clusters 410, 430, . . . , 450. A first cluster 410 may be connected to a first main channel CHA, a second cluster 430 may be connected to a second main channel CHB, and a third cluster 450 may be connected to a third main channel CHC. A structure of each of the plurality of clusters 410, 430, . . . , 450 will be described in detail referring to FIGS. 2 to 8B. A structure of each of the plurality of clusters 410, 430, . . . 450 may be substantially the same as or similar to each other.

A main channel in the present specification may be an independent data path present between the controller 310, i.e., the third interface 350, and a corresponding cluster. The data path may include transmission lines for transmitting data and/or control signals.

A way may be a group of one or more non-volatile memory devices sharing one main channel. Accordingly, a plurality of ways may be connected to one main channel. The non-volatile memory device may be a die, a memory device, or a semiconductor package. The controller 310 may control an A-channel*B-way. At this time, each of A and B is a natural number of 1 or more.

Figure 3:
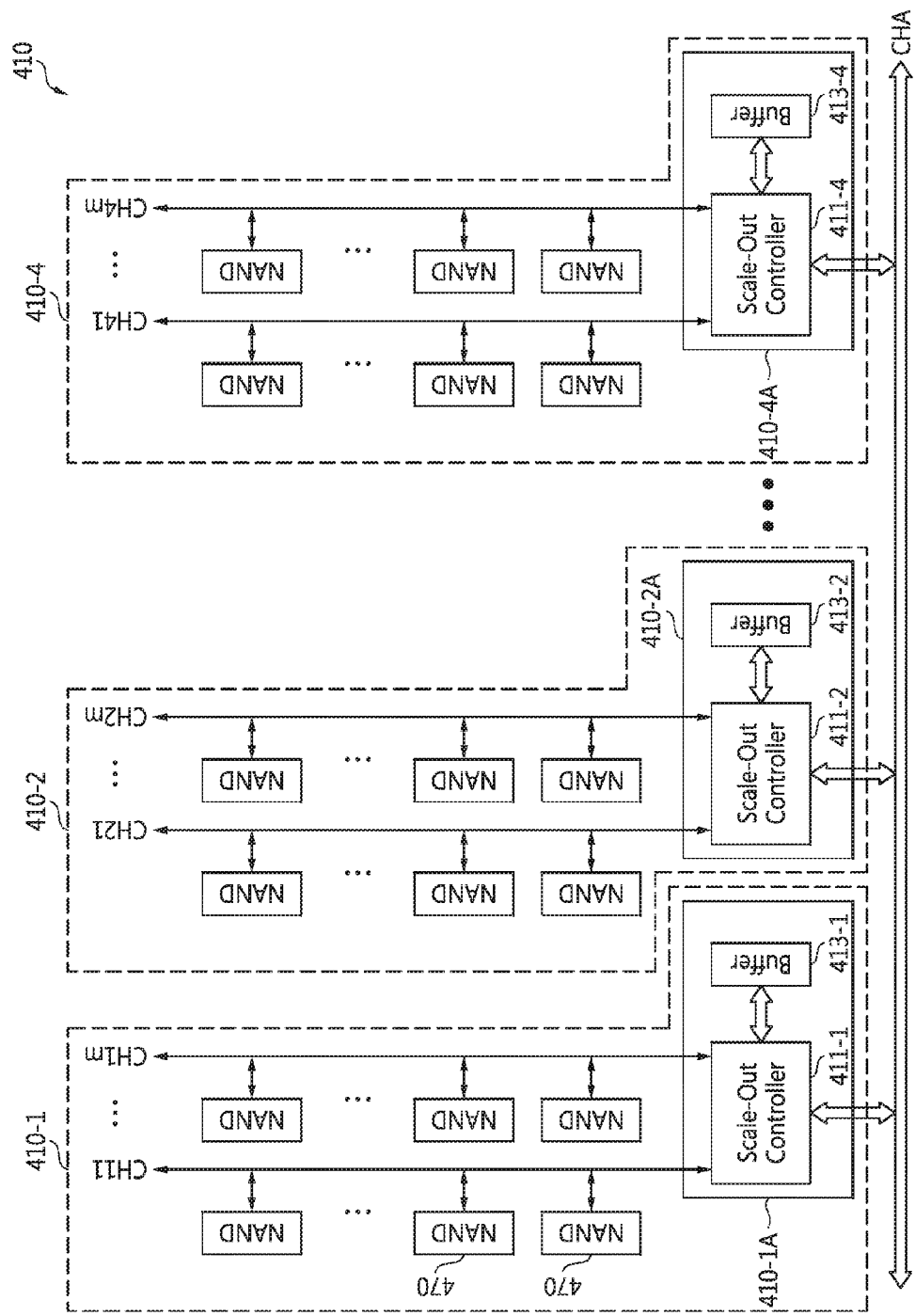
FIG. 3 is a block diagram which shows some exemplary embodiments of a first cluster shown in FIG. 2.

FIG. 2 is a specific block diagram of a data storage device 300 shown in FIG. 1, and FIG. 3 is a block diagram which shows some exemplary embodiments of a first cluster shown in FIG. 2. The data storage device 300 shown in FIG. 2 may be embodied as a data storage device having a scale-out structure.

The first cluster 410 may include at least one scale-out device and at least one non-volatile memory device, e.g., a NAND-type flash memory device NAND. Each of the rest clusters 430 to 450 may include at least one scale-out device and at least one non-volatile memory device, e.g., a NAND-type flash memory device NAND.

Referring to FIGS. 1 to 3, since the clusters 410 to 450 are substantially the same as or similar to each other in structure and operation, a structure and an operation of the first cluster 410 are representatively described. The first cluster 410 may include a plurality of scale-out storage devices 410-1 to 410-4. Although four scale-out storage devices 410-1 to 410-4 are shown in FIG. 3; however, a technical concept of the present inventive concepts is not limited to the number of the plurality of scale-out storage devices 410-1 to 410-4 included in the first cluster 410.

The first cluster 410 may include scale-out devices 410-1A, 410-2A, . . . , 410-4A and NAND-type flash memory devices NAND connected to each of the scale-out devices 410-1A, 410-2A, . . . , 410-4A. The first scale-out storage device 410-1 may include a first scale-out device 410-1A and non-volatile memory devices NAND connected to the first scale-out device 410-1A. The second scale-out storage device 410-2 may include a second scale-out device 410-2A and non-volatile memory devices NAND connected to the second scale-out device 410-2A. The fourth scale-out storage device 410-4 may include a fourth scale-out device 410-4A and non-volatile memory devices NAND connected to the fourth scale-out device 410-4A. For example, each of the scale-out storage devices 410-1, 410-2, . . . , 410-4 may be a multi-chip set.

Each of the scale-out devices 410-1A, 410-2A, . . . , 410-4A may include respective scale-out controllers 411-1, 411-2, . . . , 411-4 and respective buffers or volatile memory devices 413-1, 413-2, . . . , 413-4. The scale-out controllers 411-1, 411-2, . . . , 411-4 are substantially the same as or similar to each other in structure.

The first scale-out controller 411-1 may be connected to a first main channel CHA, channels CH11 to CH1m, where m is a natural number of two or more, and a first volatile memory device 413-1. Corresponding non-volatile memory devices NAND may be connected to each of the channels CH11 to CH1m. For example, each of the non-volatile memory devices NAND may be a NAND-type flash memory or a managed NAND flash memory device; however, it is not limited thereto. Here, each channel may be an independent data path present between the first scale-out controller 411-1 and corresponding non-volatile memory devices NAND.

The first scale-out controller 411-1 may control an operation of each of the non-volatile memory devices NAND through each of the channels CH11 to CH1m. For example, the controller 310 may control an operation of the first scale-out controller 411-1 through the first main channel CHA.

The first volatile memory device 413-1 may include a first region for storing logical address-physical address mapping information (or mapping table) on the non-volatile memory devices NAND connected to each of the channels CH11 to CH1m. Moreover, the first volatile memory device 413-1 may further include a second region (or cache region) for temporarily storing data to be written in at least one of the non-volatile memory devices NAND connected to each of the channels CH11 to CH1m or data output from at least one of the non-volatile memory devices NAND connected to each of the channels CH11 to CH1m.

Figure 7:
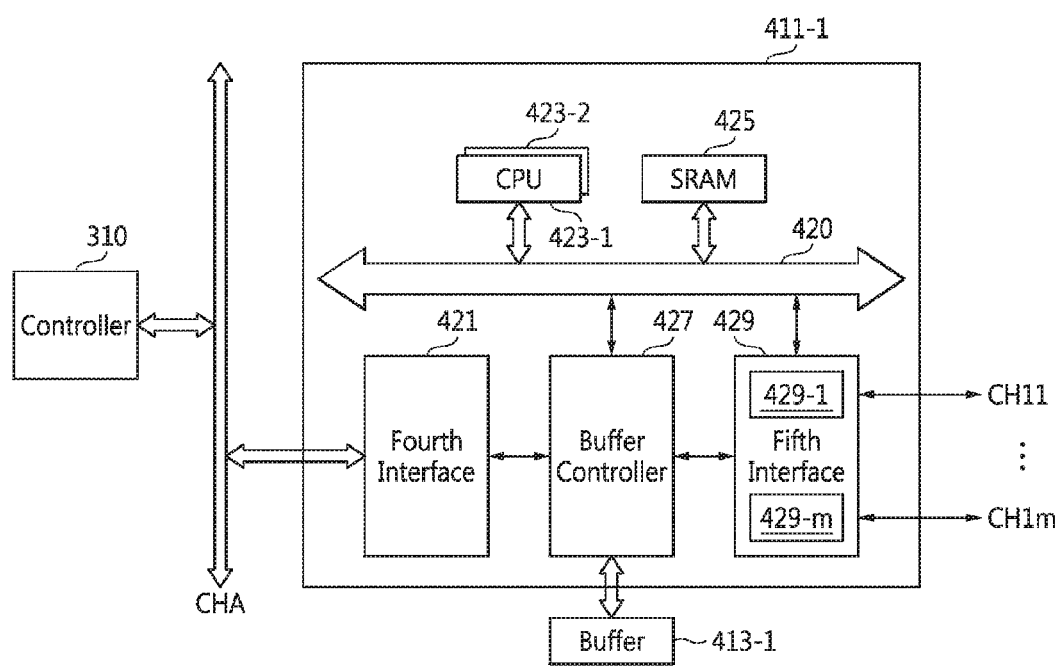
FIG. 7 is a block diagram of a first scale-out controller shown in FIG. 4.

For example, a second FTL code performed by a CPU 423-1 or 423-2 included in the first scale-out controller 411-1 may perform a logical address-physical address conversion using a mapping table stored in a first region of the first volatile memory device 413-1 as shown in FIG. 7. The second FTL code may be loaded to an internal memory 425 from a non-volatile memory device included in the first cluster 410 and performed by the CPU 423-1 or 423-2.

The second scale-out controller 411-2 may be connected to the first main channel CHA, channels CH21 to CH2*m*, and a second volatile memory device 413-2. Corresponding non-volatile memory devices NAND may be connected to each of channels CH21 to CH2*m*.

The second scale-out controller 411-2 may control an operation of each of the non-volatile memory devices NAND through each of the channels CH21 to CH2*m*. For example, the controller 310 may control an operation of the second scale-out controller 415-2 through the main channel CHA.

The second volatile memory device 413-2 may include a first region for storing logical address-physical address mapping information (or mapping table) on the non-volatile memory devices NAND connected to each of the channels CH21 to CH2*m*. Moreover, the second volatile memory device 413-2 may further include a second region (or cache region) for temporarily storing data to be written in at least one of the non-volatile memory devices NAND connected to each of the channels CH21 to CH2*m* or data output from at least one of the non-volatile memory devices NAND connected to each of the channels CH21 to CH2*m*.

As shown in FIG. 7, when the first scale-out controller 411-1 is the same as the second scale-out controller 411-2 in structure, a third FTL code performed by the CPU 423-1 or 423-2 included in the second scale-out controller 411-2 may perform a logical address-physical address conversion using the mapping table stored in the first region of the second volatile memory device 413-2. The third FTL code may be loaded to the internal memory 425 from the non-volatile memory device included in the first cluster 410 and performed by the CPU 423-1 or 423-2.

The fourth scale-out controller 411-4 may be connected to the first main channel CHA, channels CH41 to CH4*m*, and a fourth volatile memory device 413-4. Corresponding non-volatile memory devices NAND may be connected to each of the channels CH41 to CH4*m*.

The fourth scale-out controller 411-4 may control an operation of each of the non-volatile memory devices NAND through each of the channels CH41 to CH4*m*. For example, the controller 310 may control an operation of the fourth scale-out controller 411-4 through the main channel CHA.

The fourth volatile memory device 413-4 may include a first region for storing logical address-physical address mapping information (or mapping table) on corresponding non-volatile memory devices NAND connected to each of the channels CH41 to CH4*m*. Moreover, the fourth volatile memory device 413-4 may further include a second region (or cache region) for temporarily storing data to be written in at least one of the corresponding non-volatile memory devices NAND connected to each of the channels CH41 to CH4*m* or data output from at least one of the corresponding non-volatile memory devices NAND connected to each of the channels CH41 to CH4*m*.

As shown in FIG. 7, when the first scale-out controller 411 is the same as the fourth scale-out controller 411-4 in structure, a fifth FTL code performed by the CPU 423-1 or 423-2 included in the fourth scale-out controller 411-4 may perform a logical address-physical address conversion using the mapping table stored in the first region of the fourth volatile memory device 413-4. The fifth FTL code may be loaded to the internal memory 425 from the non-volatile memory device included in the first cluster 410 and performed by the CPU 423-1 or 423-2.

Each of the volatile memory devices 413-1 to 413-4 may be a buffer or a buffer memory, and may be embodied as a RAM, a SRAM, or a DRAM; however, it is not limited thereto.

It is shown that each of the scale-out storage devices 410-1 to 410-4 includes the same number of channels in FIG. 3; however, the number of channels included in each of the scale-out storage devices 410-1 to 410-4 may be different from each other according to some exemplary embodiments.

Figure 4:
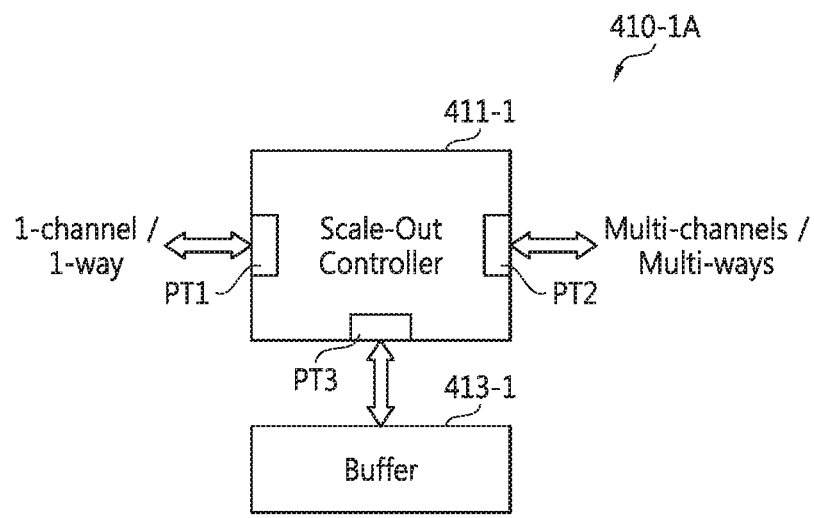
FIG. 4 is a schematic diagram of a first scale-out device shown in FIG. 3.

FIG. 4 is a schematic diagram of a first scale-out device 410-1A shown in FIG. 3, and FIG. 7 is a block diagram of a first scale-out controller 411-1 shown in FIG. 4. Referring to FIGS. 1 to 5, and 7, since the scale-out controllers 411-1 to 411-4 are substantially the same as or similar to each other in structure and operation, a structure and an operation of the first scale-out controller 411-1 will be representatively described herein.

The first scale-out controller 411-1 may control transmission of a command and/or data transmitted or received among the controller 310, the first volatile memory device 413-1, and the non-volatile memory devices NAND included in the first scale-out storage device 410-1. According to some exemplary embodiments, the first scale-out controller 411-1 may be embodied as an IC or a SoC.

The first scale-out controller 411-1 may include a bus architecture 420, a fourth interface 421, at least one CPU 423-1 and/or 423-2, an internal memory 425, a buffer controller 427, and a fifth interface 429. The bus architecture 420 may be embodied as AMBA, AHB, APB, AXI, ASB, ACE, or a combination of these; however, it is not limited thereto.

The fourth interface 421 may change a format of a response and/or data to be transmitted to the controller 310 and transmit the response having a changed format and/or the data having a changed format to the controller 310 through the first main channel CHA. Moreover, the fourth interface 421 may receive a command and/or data transmitted from the controller 310, change a format of a received command and/or data, and transmit the command having a changed format and/or the data having a changed format to at least one CPU 423-1 and/or 423-2, and/or to the buffer controller 427. According to some exemplary embodiments, the fourth interface 421 may include a transceiver for transmitting or receiving a signal and/or data.

The structure and an operation of the fourth interface 421 may be embodied to be compatible with the structure and the operation of the third interface 350. For example, the fourth interface 421 may be embodied as a SATA interface, a SATAe interface, a SAS interface, a PCIe interface, a NVMe interface, an AHCI interface, a MMC interface, a NAND-type flash memory interface, or a NOR-type flash memory interface; however, it is not limited thereto.

According to some exemplary embodiments, referring to FIGS. 4 and 7, the fourth interface 421 may be connected to one channel (or one main channel) or one way. First terminals PT1 are terminals for connecting the first main channel CHA and the fourth interface 421, third terminals PT3 are terminals for connecting the first volatile memory device 413-1 and the buffer controller 427, and second terminals PT2 are terminals for connecting the fifth interface 429 and one or more channels CH11 to CH1*m*. The terminals may be pins or pads.

One or more CPUs 423-1 and/or 423-2 may control the fourth interface 421, the internal memory 425, the buffer controller 427, and the fifth interface 429 through the bus architecture 420. Each of the CPUs 423-1 and/or 423-2 may include one or more cores.

For example, a first CPU 423-1 may transmit or receive data to or from the third interface 350 through the first main channel CHA and the fourth interface 421, and a second CPU 423-2 may transmit or receive data to or from at least one of the non-volatile memory devices NAND connected to each of the channels CH11 to CH1*m* through the fifth interface 429. According to some exemplary embodiments, the first CPU 423-1 and the second CPU 423-2 may configure a multi-CPU. According to some exemplary embodiment, the first CPU 423-1 may control the second CPU 423-2.

The internal memory 425 may store data necessary for an operation of a first scale-out controller 415-1 or data generated by a data processing operation (for example, a write operation or a read operation) performed by the first scale-out controller 415-1. For example, the internal memory 425 may store a second flash translation layer (FTL) code which can be executed by the CPU 423-1 and/or 423-2. For example, when a data storage device 300 is booted, the second FTL code may be loaded to the internal memory 425 from a non-volatile memory included in the memory cluster 400. According to some exemplary embodiments, the internal memory 425 may be embodied as a RAM, a DRAM, a SRAM, a buffer, a buffer memory, a cache, or a TCM; however, it is not limited thereto.

The buffer controller 427 may write data in the first volatile memory device 413-1 or read data from the first volatile memory device 413-1 according to a control of the first CPU 423-1 or the second CPU 423-2. The buffer controller 427 may be referred to as a controller or a buffer manager which can control a write operation and a read operation for the first volatile memory device 413-1.

The fifth interface 429 may control data processing operations for the non-volatile memory devices NAND through a corresponding channel among a plurality of channels CH11 to CH1*m* according to a control of the first CPU 423-1 or the second CPU 423-2.

Referring to FIGS. 4 and 7, a plurality of channels and/or a plurality of ways may be connected to the fifth interface 429. According to some exemplary embodiments, the fifth interface 429 may be embodied as a SATA interface, a SATAe interface, a SAS interface, a PCIe interface, a NVMe interface, an AHCI interface, a MMC interface, a NAND-type flash memory interface, or a NOR-type flash memory interface; however, it is not limited thereto. For example, the fifth interface 429 may include each of memory controllers 429-1 to 429-*m* corresponding to each of the channels CH11 to CH1*m*. For example, when each of the non-volatile memory devices NAND is a NAND-type flash memory, each of the memory controllers 429-1 to 429-*m* may be a flash memory controller.

The first volatile memory device 413-1 may include a first region for storing a mapping table for a logical address-physical address conversion of the non-volatile memory devices NAND included in the first scale-out storage device 410-1 and a second region which can perform a function of cache; however, it is not limited thereto. For example, a second FTL code performed by the CPU 423-1 and/or 423-2 may perform a logical address-physical address conversion using the mapping table stored in the first region.

When at least one of the non-volatile memory devices NAND described referring to FIG. 3 is replaced with the first scale-out device 410-1A, scalability in capacity of the memory cluster 400 may be increased.

Figure 5:
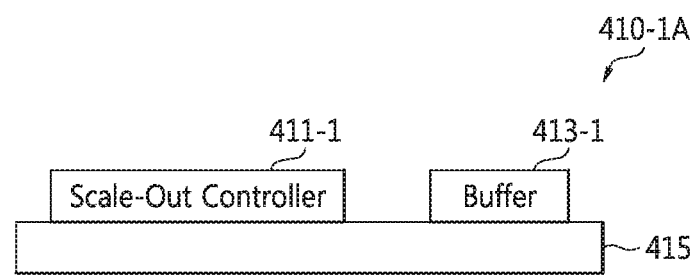
FIG. 5 is an exemplary embodiment of a semiconductor package of the first scale-out device shown in FIG. 4.

FIG. 5 is an exemplary embodiment of a semiconductor package 410-1A of the first scale-out device shown in FIG. 4. Referring to FIGS. 3 to 5, the first scale-out device 410-1A may be embodied as a semiconductor package. That is, the first scale-out device 410-1A may include the first scale-out controller 411-1 and the first volatile memory device 413-1 each attached or mounted on a semiconductor substrate 415.

For example, the first volatile memory device 413-1 may be attached or mounted on the semiconductor substrate 415 in a flip-chip structure. Moreover, when the first volatile memory device 413-1 is attached or mounted on the semiconductor substrate 415 through an adhesive material, the first volatile memory device 413-1 may transmit or receive electrical signals to or from the semiconductor substrate 415 through bonding wires. That is, the first scale-out controller 411-1 may transmit or receive a command and/or data to or from the first volatile memory device 413-1 through the semiconductor substrate 415. Semiconductor packages for the scale-out devices 410-1A to 410-4A are substantially the same as or similar to each other.

Figure 6:
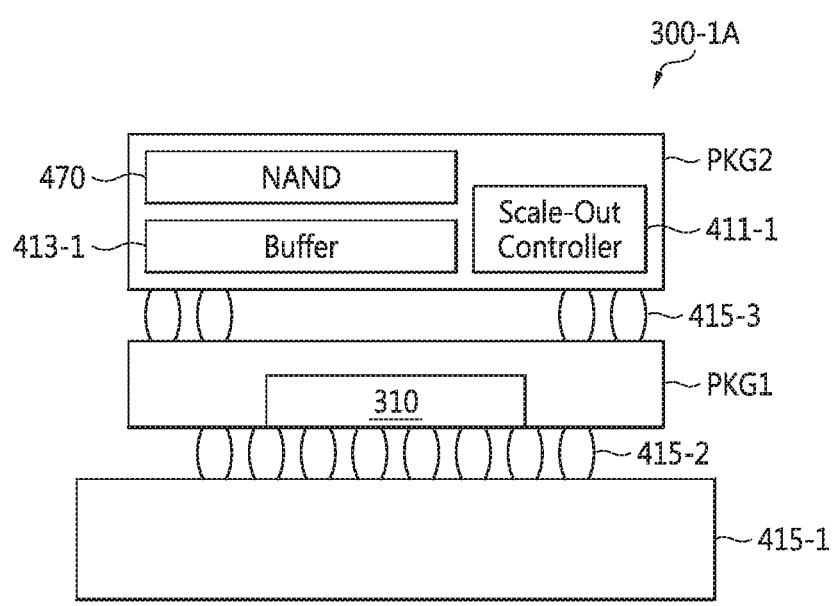
FIG. 6 is an exemplary embodiment of a semiconductor package which includes a controller and a first scale-out storage device shown in FIG. 1.

FIG. 6 is an exemplary embodiment of a semiconductor package 300-1A which includes a controller and a first scale-out storage device shown in FIG. 1. The semiconductor package 300-1A shown in FIG. 6 may be embodied as an embedded package on package (ePOP); however, a type of the semiconductor package 300-1A is not limited thereto.

For example, the semiconductor package 300-1A may include a semiconductor substrate 415-1, a first package PKG1 disposed over the semiconductor substrate 415-1, and a second package PKG2 disposed over the first package PKG1. The first package PKG1 may be attached or mounted on the semiconductor substrate 415-1 through first bumps 415-2, and transmit or receive electrical signals to or from the semiconductor substrate 415-1 through the first bumps 415-2. The second package PKG2 may be attached or mounted on the first package PKG1 through second bumps 415-3, and transmit or receive electrical signals to or from the semiconductor substrate 415-1 through the second bumps 415-3. The first package PKG1 may include the controller 310. The second package PKG2 may include the first scale-out controller 411-1, the first volatile memory device 413-1, and at least one NAND-type flash memory 470. For example, when each of the scale-out storage devices 410-2, . . . , 410-4 is embodied as each package and is attached or mounted on the semiconductor substrate 415-1, the controller 310 may control each of the scale-out storage devices 410-2, . . . , 410-4 through the semiconductor substrate 415-1.

Referring to FIGS. 2, 3, and 7 again, the data storage device 300 includes the controller 310 and the memory cluster 400, a plurality of scale-out storage devices are included in the memory cluster 400, and each of the scale-out storage devices is substantially the same as the first scale-out storage device 410-1 shown in FIG. 3 in structure.

Figure 8A:
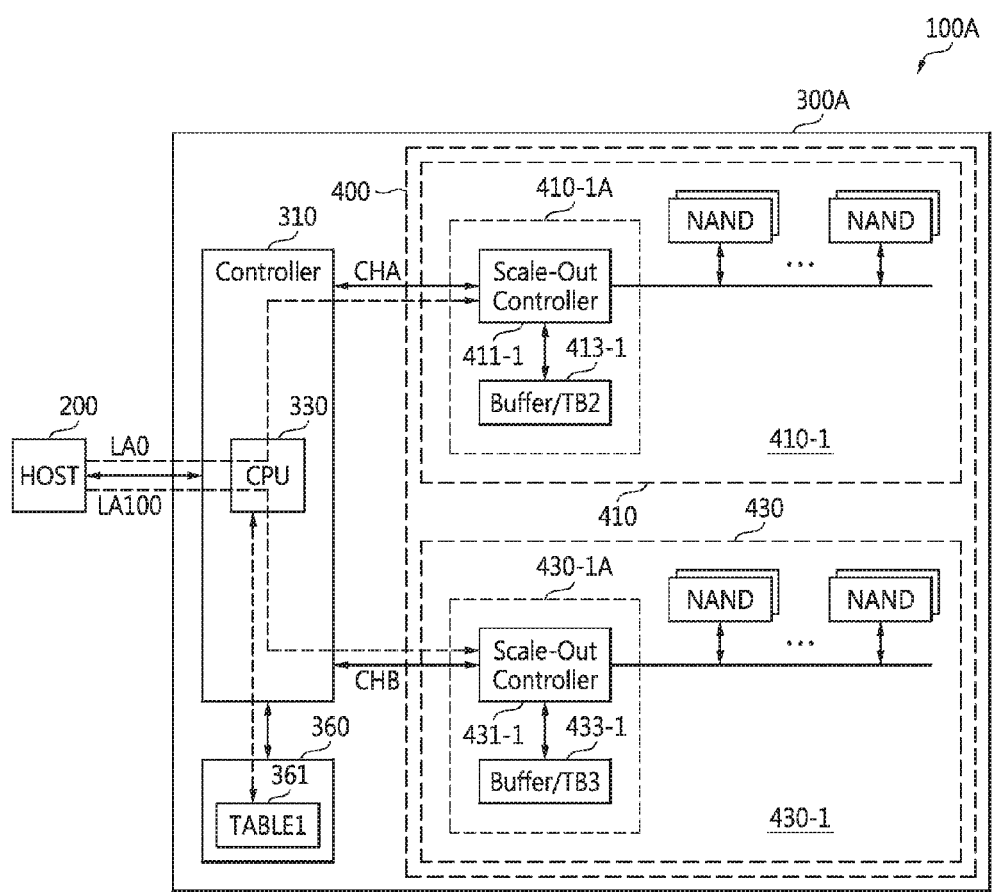
FIG. 8A is a block diagram which illustrates an operation of the data processing system shown in FIG. 1.

FIG. 8A is a block diagram that illustrates an operation of the data processing system shown in FIG. 1. Referring to FIGS. 1, 2, 7, and 8A, the data processing system 100A may include a host 200 and a data storage device 300A, and the data storage device 300A may include the controller 310, the buffer 360, and the memory cluster 400.

The memory cluster 400 includes a first cluster 410 and a second cluster 430, the first cluster 410 includes the first scale-out storage device 410-1, the second cluster 430 includes the second scale-out storage device 430-1, and the first scale-out controller 411-1 is assumed to be substantially the same as the second scale-out controller 413-1 in structure.

Although the first cluster 410 including the first scale-out storage device 410-1 and the second cluster 430 including the second scale-out storage device 430-1 are exemplarily shown in FIG. 8A, a technical concept of the present inventive concepts is not limited to the number of scale-out storage devices included in each of the clusters 410 and 430. Accordingly, the first cluster 410 may include at least one scale-out storage device, and the second cluster 430 may include at least one scale-out storage device.

The CPU 330 of the controller 310 is assumed to distribute a logical address according to Equation 1. For example, a logical address may be a logical block address (LBA) or logical page number (LPN); however, it is not limited thereto.

$$GLPN=iLPN*X+NUM \quad \text{[Equation 1]}$$

Figure 8B:
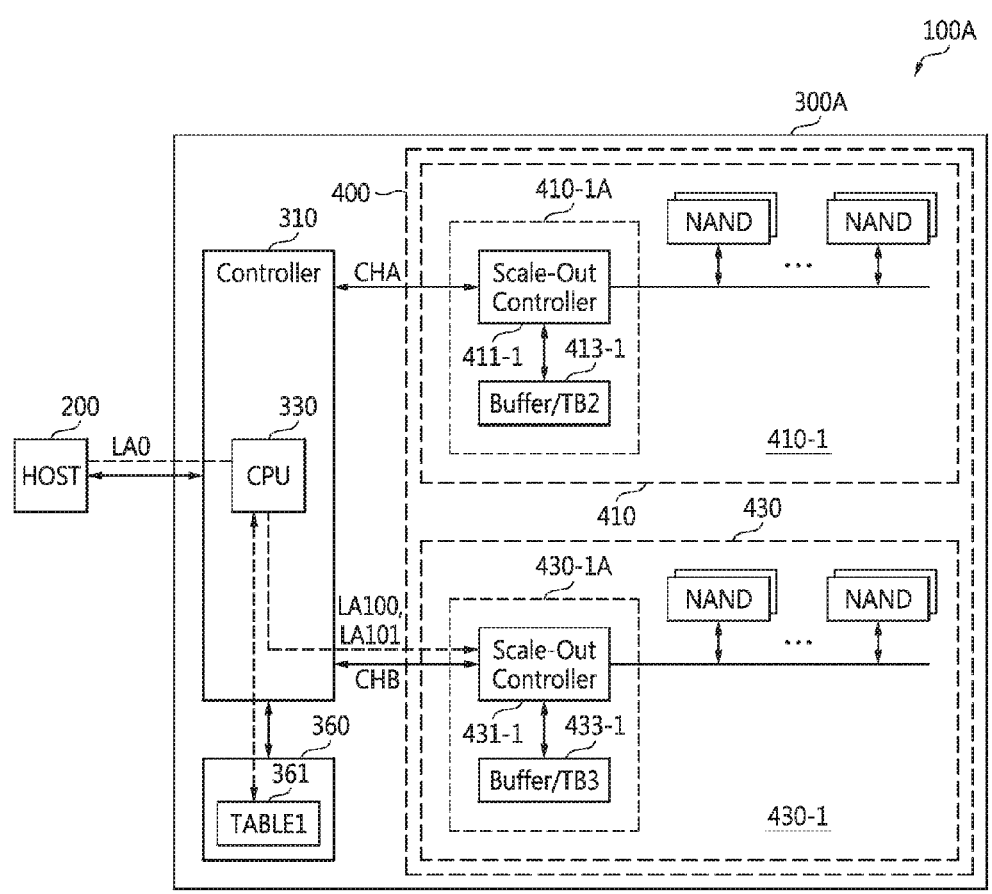
FIG. 8B is a block diagram which illustrates an operation of the data processing system shown in FIG. 1 that performs a logical address swap operation.

Here, GLPN represents a global logical page number, iLPN represents a local logical page number of an $i^{th}$ cluster, X represents the number of clusters (or multi-chip set) included in the data storage device 300A, and NUM represents a cluster number. In FIGS. 8A and 8B, it is assumed that X is two (2), NUM of the first cluster 410 or the first scale-out storage device 410-1 is zero (0), and NUM of the second cluster 430 or the second scale-out storage device 430-1 is one (1).

In addition, it is assumed that a table 361 includes transmission mapping information (hereinafter, referred to as "first mapping information") on to which of clusters 410 and 430 to transmit a logical address output from the host 200.

According to some exemplary embodiments, referring to FIGS. 8A and 12, when the CPU 220 of the host 200 outputs a global logical address (LA0=GLPN0), the CPU 330 of the controller 310 or the first FTL executed by the CPU 330 may transmit a global logical address LA0=GLPN0 to the first cluster 410 corresponding to the global logical address LA0=GLPN0 using the Equation 1 and/or the first mapping information.

The CPU 423-1 of the first scale-out controller 411-1 or the second FTL executed by the CPU 423-1 may convert a local logical address 1LPN0 corresponding to a global logical address LA0=GLPN0 to a physical address 1PPN0 using a logical address-physical address mapping table TB2 stored in the volatile memory 413-1. For example, the local logical address 1LPN0 may be an entry of the logical address-physical address mapping table TB2.

According to some exemplary embodiments, referring to FIGS. 8A and 12, when the CPU 220 of the host 200 outputs a local logical address LA0=1LPN0, the CPU 330 of the controller 310 or the first FTL executed by the CPU 330 may transmit a local logical address LA0=1LPN0 to the first cluster 410 corresponding to the local logical address LA0=1LPN0 using Equation 1 and/or the first mapping information.

The CPU 423-1 of the first scale-out controller 411-1 or the second FTL executed by the CPU 423-1 may convert the local logical address 1LPN0 into the physical address 1PPN0 using the logical address-physical address mapping table TB2 stored in the volatile memory 413-1.

According to some exemplary embodiments, referring to FIGS. 8A and 12, when the CPU 220 of the host 200 outputs a global logical address LA100=GLPN201, the CPU 330 of the controller 310 or the first FTL executed by the CPU 330 may transmit a global logical address LA100=GLPN201 to the second cluster 430 corresponding to the global logical address LA100=GLPN201 using Equation 1 and/or the first mapping information.

When the first scale-out controller 411-1 is substantially the same as a second scale-out controller 431-1 in structure, the CPU 423-1 of the second scale-out controller 431-1 or the third FTL executed performed by the CPU 423-1 may convert a local logical address 2LPN100 corresponding to the global logical address LA100=GLPN201 into a physical address 2PPN100 using a logical address-physical address mapping table TB3 stored in a volatile memory 433-1. For example, a local logical address 2LPN100 may be an entry of the logical address-physical address mapping table TB3.

According to some exemplary embodiments, referring to FIGS. 8A and 12, when the CPU 220 of the host 200 outputs a local logical address LA100=2LPN100, the CPU 330 of the controller 310 or the first FTL executed by the CPU 330 may transmit the local logical address LA100=2LPN100 to the second cluster 430 corresponding to the local logical address LA100=2LPN100 using Equation 1 and/or the first mapping information.

The CPU 423-1 of the second scale-out controller 431-1 or the third FTL executed by the CPU 423-1 may convert the local logical address 2LPN100 into the physical address 2PPN100 using the logical address-physical address mapping table TB3 stored in the volatile memory 433-1.

As shown in FIG. 12, a global logical address of the first cluster 410 may be allocated to an even number, and a global logical address of the second cluster 430 may be allocated to an odd number; however, it is not limited thereto.

Figure 9:
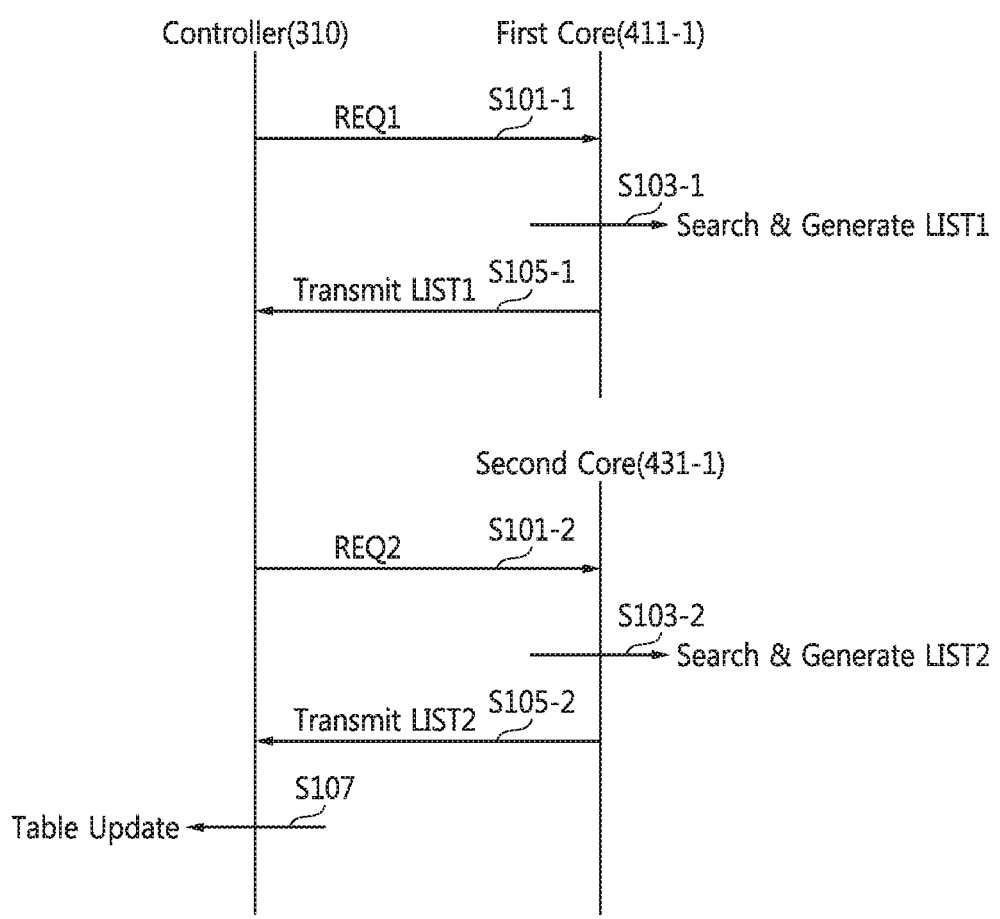
FIG. 9 is a flow diagram which illustrates a swap mapping table update operation according to some exemplary embodiments of the present inventive concept.

FIG. 9 is a flow diagram that illustrates a swap mapping table update operation according to some exemplary embodiments of the present inventive concept. Referring to FIGS. 1, 2, 8A, and 9, the controller 310, e.g., the CPU 330 and/or 331, may transmit a first request REQ1 to the first scale-out controller (that is, a first core) 411-1 (S101-1).

For example, the first core 411-1 may compare a wear-out count of each of blocks included in a memory cell array of at least one NAND-type flash memory device NAND managed by the first core 411-1 with a reference wear-out count in response to the first request REQ1, search a block(s) having a higher count than the reference wear-out count based on a result of the comparison, and generate a first list LIST1 according to a result of the search (S103-1). The first core 411-1 may transmit the first list LIST1 to the controller 310 (S105-1). The first list LIST1 may be stored in the volatile memory 413-1 and/or at least one NAND-type flash memory device NAND connected to the first core 411-1 according to a control of the first core 411-1.

For example, when a wear-out count of a first storage region corresponding to a logical address (LA0=GLPN0 or LA0=1LPN0), e.g., a page corresponding to the physical address 1PPN0, is higher than a reference wear-out count, the first core 411-1 may generate a first list LIST1 including a logical address (LA0=GLPN0, or LA0=1LPN0) of the first storage region (S103-1), and transmit the first list LIST1 to the host 200 (S105-1).

As described above, a wear-out count of the first storage region may be an erase count, a program cont, a read count, a bad block occurrence number, or a read error occurrence number; however, it is not limited thereto.

In addition, the first core 411-1 may determine whether or not the first storage region is a region for storing one of hot data and cold data in response to a first request REQ1, generate the first list LIST1 including a logical address (LA0=GLPN0, or LA0=1LPN0) of the first storage region according to a result of the determination (S103-1), and transmit the first list LIST1 to the host 200 (S105-1).

The controller 310, e.g., the CPU 330 and/or 331, may transmit a second request REQ2 to the second scale-out controller (that is, a second core) 431-1 (S101-2).

For example, the second core 431-1 compares a wear-out count of each of the blocks included in a memory cell array of at least one NAND-type flash memory device NAND managed by the second core 431-1 with a reference wear-out count in response to the second request REQ2, searches a block(s) having a lower count than the reference wear-out count according to a result of the comparison, and generates a second list LIST2 according to a result of the search (S103-2). The second core 431-1 may transmit the second list LIST2 to the controller 310 (S105-2).

The second list LIST2 may be stored in the volatile memory device 433-1 and/or at least one NAND-type flash memory device NAND connected to the second core 431-1 according to a control of the second core 431-1.

For example, a wear-out count of a second storage region corresponding to a logical address LA100=GLPN201 or LA100=2LPN100, e.g., a page corresponding to the physical address 2PPN100, is lower than a reference wear-out count, the second core 431-1 generates a second list LIST2 including the logical address LA100=GLPN201 or LA100=2LPN100 (S103-2) of the second storage region, and transmits the second list LIST2 to the host 200 (S105-2). As described above, the wear-out count of the second storage region may be an erase count, a program count, a read count, a bad block occurrence number, or a read error occurrence number; however, it is not limited thereto.

Moreover, the second core 431-1 determines whether or not the second storage region is a region for storing the other of the hot data and the cold data in response to the second request REQ2, generates the second list LIST2 including the logical address LA100=GLPN201 or LA100=2LPN100 of the second storage region according to a result of the determination (S103-2), and transmits the second list LIST2 to the host 200 (S105-2).

Steps S101-1 and S101-2, S103-1 and S103-2, and S105-1 and S105-2 may be performed at the same time or in a parallel manner. For example, each of the steps S101-1, S103-1, and S105-1 may be performed prior to or later than each of the steps S101-2, S103-2, and S105-2.

The CPU 330 of the controller 310 may receive the first list LIST1 and the second list LIST2, generate the swap mapping table TB1 as shown in FIG. 11 based on the lists LIST1 and LIST2, and store the swap mapping table TB1 in the volatile memory 360 (S107). For example, the swap mapping table TB1 may be at least a portion of a table TABLE1.

FIG. 11 is an exemplary embodiment of a swap mapping table for the logical address swap operation. According to some exemplary embodiments, the swap mapping table TB1 may include a source global logical address GPLN0=0 and a destination global logical address GLPN201=201. According to some exemplary embodiments, the swap mapping table TB1 may include a source local logical address 1LPN0 and a destination local logical address 2LPN100.

Figure 10:
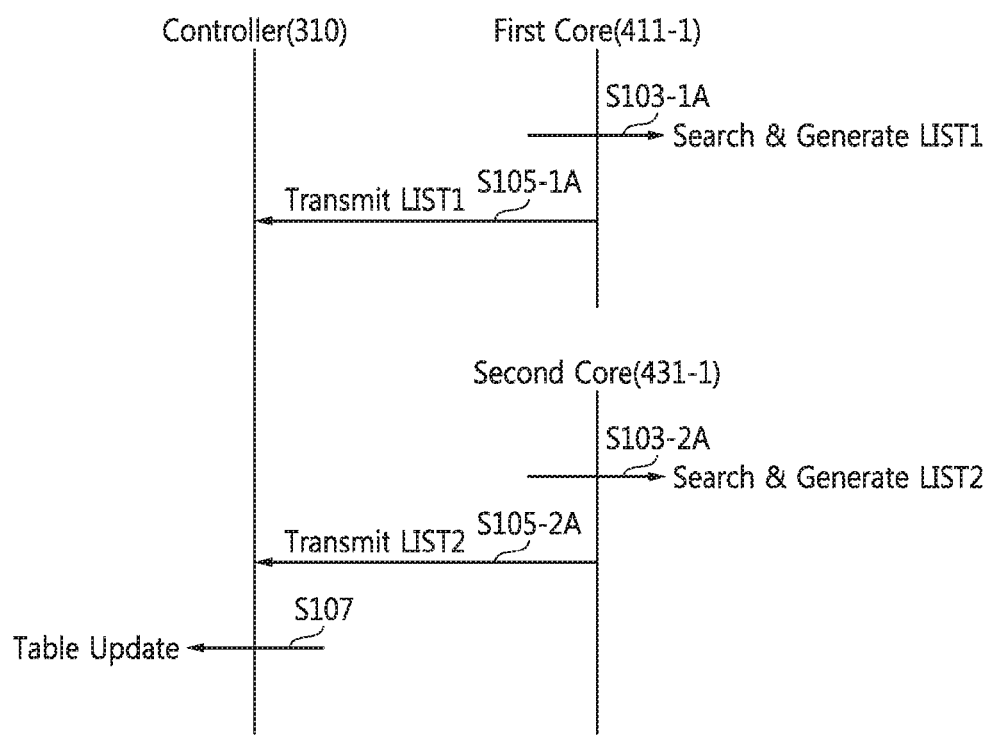
FIG. 10 is a flow diagram which illustrates a swap mapping table update operation according to some exemplary embodiments of the present inventive concept.

FIG. 10 is a flow diagram that illustrates a swap mapping table update operation according to some exemplary embodiments of the present inventive concept.

Each of cores 411-1 and 431-1 generates each of the lists LIST1 and LIST2 in response to each of the requests REQ1 and REQ2 output from the controller 310 and transmits each of the lists LIST1 and LIST2 to the host 200 in FIG. 9. However, even if there is no request from the controller 310, each of the cores 411-1 and 431-1 may autonomously or voluntarily generate each of the lists LIST1 and LIST2 and transmit each of the lists LIST1 and LIST2 to the host 200 in FIG. 10.

For example, the first core 411-1 compares a wear-out count of each of blocks included in a memory cell array of at least one NAND-type flash memory device NAND managed by the first core 411-1 with a reference wear-out count, searches a block(s) having a higher count than the reference wear-out count according to a result of the comparison, and generates the first list LIST1 according to a result of the search (S103-1A). The first core 411-1 may transmit the first list LIST1 to the controller 310 (S105-1A). The first list LIST1 may be stored in the volatile memory 413-1 and/or at least one NAND-type flash memory device NAND connected to the first core 411-1 according to a control of the first core 411-1.

For example, when a wear-out count of a first storage region corresponding to a logical address LA0=GLPN0 or LA0=1LPN0, e.g., a page corresponding to a physical address 1PPN0, is higher than a reference wear-out count, the first core 411-1 may generate the first list LIST1 including the logical address LA0=GLPN0 or LA0=1LPN0 of the first storage region (S103-1A), and transmit the first list LIST1 to the host 200 (S105-1A).

Moreover, the first core 411-1 may determine whether or not the first storage region is a region for storing one of hot data and cold data, generate a first list LIST1 including the logical address LA0=GLPN0 or LA0=1LPN0 of the first storage region according to a result of the determination (S103-1A), and transmit the first list LIST1 to the host 200 (S105-1A).

For example, the second core 431-1 may compare a wear-out count of each of blocks included in a memory cell array of at least one NAND-type flash memory device NAND managed by the second core 431-1 with a reference wear-out count, search a block(s) having a lower count than the reference wear-out count according to a result of the comparison, and generate a second list LIST2 according to a result of the search (S103-2A). The second core 431-1 may transmit the second list LIST2 to the controller 310 (S105-2A).

The second list LIST2 may be stored in the volatile memory device 433-1 and/or at least one NAND-type flash memory device NAND connected to the second core 431-1 according to a control of the second core 431-1.

For example, when a wear-out count of a second storage region corresponding to the logical address LA100=GLPN201 or LA100=2LPN100, e.g., a page corresponding to a physical address 1PPN100, is lower than a reference wear-out count, the second core 431-1 may generate a second list LIST2 including the logical address LA100=GLPN201 or LA100=2LPN100 of the second storage region (S103-2A) and transmit the second list LIST2 to the host 200 (S105-2A).

Moreover, the second core 431-1 may determine whether or not the second storage region is a region for storing the other of the hot data and the cold data, generate the second list LIST2 including the logical address LA100=GLPN201 or LA100=2LPN100 of the second storage region according to a result of the determination (S103-2A), and transmit the second list LIST2 to the host 200 (S105-2A).

Steps S103-1A and S103-2A, and S105-1A and S105-2A may be performed at the same time or in a parallel manner. For example, each of the steps S103-1A and S105-1A may be performed prior to or later than each of the steps S103-2A and S105-2A.

FIG. 8B is a block diagram that illustrates an operation of the data processing system shown in FIG. 1 that performs a logical address swap operation.

Referring to FIGS. 8B to 12, when the CPU 220 of the host 200 outputs a global logical address LA0=GLPN0, the CPU 330 of the controller 310 or a first FTL executed by the CPU 330 may transmit a swapped global logical address LA100=GLPN201=201 to the second cluster 430 corresponding to the swapped global logical address LA100=GLPN201=201 which is swapped the global logical address LA0=GLPN0=0 using the swap mapping table TB1 shown in FIG. 11.

The CPU 423-1 of the second scale-out controller 431-1 or the third FTL executed by the CPU 423-1 may convert the local logical address 2LPN100 corresponding to the swapped global logical address LA100=GLPN201=201 into the physical address 2PPN100 using the logical address-physical address mapping table TB3 stored in the volatile memory 433-1.

Figure 13:
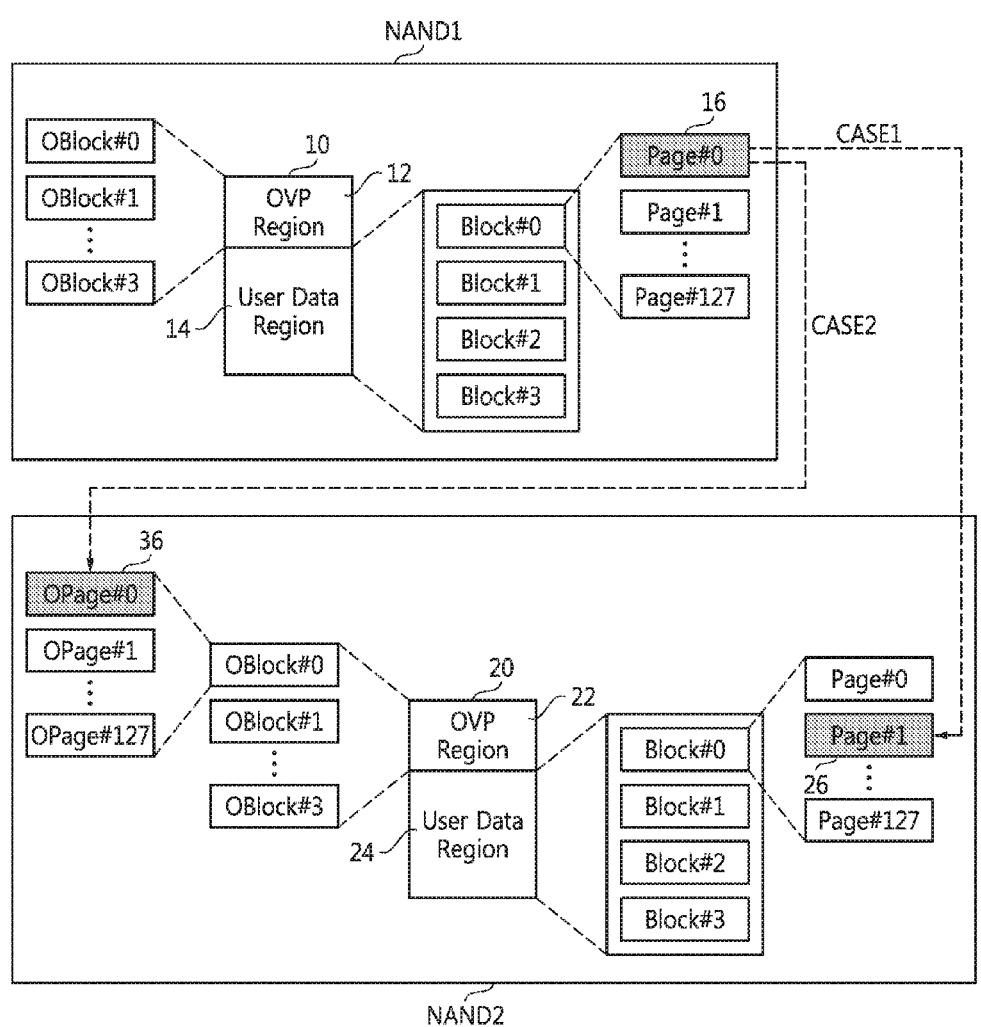
FIG. 13 is a conceptual diagram which illustrates a data swap operation of the data storage device shown in FIG. 8B.

FIG. 12 is a conceptual diagram that illustrates a relationship among a logical address, a physical address, and a global logical address, and FIG. 13 is a conceptual diagram which describes a data swap operation of the data storage device shown in FIG. 8B.

Referring to FIGS. 8A to 13, it is assumed that a first memory map NAND1 shown in FIG. 13 represents a total memory map of at least one NAND-type flash memory device NAND managed by the first core 411-1, and a second memory map NAND2 represents a total memory map of at least one NAND-type flash memory device NAND managed by the second core 431-1.

In the first memory map NAND1, it is assumed that a first memory region 10 includes a first over-provisioning region 12 and a first user data region 14, the first over-provisioning region 12 includes blocks OBlock#0 to OBlock#3, the first user data region 14 includes blocks Block#0 to Block#3, and each of the blocks OBlock#0 to OBlock#3 and Block#0 to Block#3 includes pages Page#0 to Page#127.

Moreover, in the second memory map NAND2, it is assumed that a second memory region 20 includes a second over-provisioning region 22 and a second user data region 24, the second over-provisioning region 22 includes blocks OBlock#0 to OBlock#3, the second user data region 24 includes blocks Block#0 to Block#3, each of the blocks OBlock#0 to OBlock#3 includes pages OPage#0 to OPage127, and each of the blocks Block#0 to Block#3 includes pages Page#0 to Page#127.

Referring to FIG. 12 again, it is assumed that first entries PA101 of the mapping table TB2 are entries for a logical address-physical address mapping for the first user data region 14 of the first memory region 10, and second entries PA103 of the mapping table TB2 are entries for a logical address-physical address mapping for the first over-provisioning region 12 of the first memory region 10.

Moreover, it is assumed that the first entries PA201 of the mapping table TB3 are entries for a logical address-physical address mapping for the second user data region 24 of the second memory region 20, and second entries PA203 of the mapping table TB3 are entries for a logical address-physical address mapping for the second over-provisioning region 22 of the second memory region 20. The logical address LA0=GLPN0 or LA0=1LPN0 is an address corresponding to a page 16 of the first memory region 10 of FIG. 13, and a logical address LA100=GLPN201 or LA100=2LPN100 is an address corresponding to a page 26 of the second memory region 20 of FIG. 13.

Referring to FIGS. 8B, 12, and 13, when the logical address LA0=GLPN0 or LA0=1LPN0 is a logical address for a program (or write) operation, the controller 310 may write program data output from the host 200 in a second page Page#1 or 26 of a first block Block#0 of the second user data region 24 of a second storage region, e.g., the second memory region 20, designated by the physical address 2PPN100 corresponding to the swapped logical address LA100=GLPN201 or LA100=2LPN100.

That is, the controller 310 may program the program data in the second page Page#1 or 26 of the first block Block#0 of the second user data region 24 of the second memory region 20 instead of the first page Page#0 or 16 of the first block Block#0 of the first user data region 14 of the first memory region 10.

As shown in CASE1, the controller 310 may swap first data stored in the first page Page#0 or 16 of the first block Block#0 of the first user data region 14 of the first memory region 10 with second data stored in the second page Page#1 or 26 of the first block Block#0 of the second user data region 24 of the second memory region 20. Accordingly, the second data may be stored in the first page Page#0 or 16 and the first data may be stored in the second page Page#1 or 26.

When the logical address LA0=GLPN0 or LA0=1LPN0 is a logical address for reading the first data, the controller 310 may transmit the swapped logical address LA100=GLPN201 or LA100=2LPN100 to the second core 431-1. Accordingly, the second core 431-1 may transmit first data stored in the second page Page#1 or 26 corresponding to the swapped logical address LA100=GLPN201 or LA100=2LPN100 to the controller 310, and the controller 310 may transmit the first data to the host 200.

In other words, a data storage device 300 or 300A according to some exemplary embodiments of the present inventive concept may change or swap a logical address (e.g., LA0) of wear-leveling-required data with another logical address (for example, LA100) using the swap mapping table TB1 of FIG. 11. Accordingly, the data storage device 300 or 300A may support global wear leveling between the clusters 410 and 430 or between the scale-out storage devices 410-1 and 430-1.

As shown in FIGS. 8A and 8B, the controller 310 may swap a logical address (e.g., LA0) of a wear leveling source block (e.g., a block with a high wear-count) of the first scale-out storage device 410-1 or a storage region (e.g., 16) of the wear leveling source block with a logical address (e.g., LA100) of a wear leveling destination block (e.g., a block with a low wear-count) of the second scale-out storage device 430-1 or a storage region (e.g., 26) of the wear leveling destination block. Accordingly, the data storage device 300 or 300A may perform wear leveling (i.e., global weal leveling) on the clusters 410 and 430 or the scale-out storage devices 410-1 and 430-1.

CASE2 shown in FIGS. 8B, 12, and 13 is a conceptual diagram for describing a method of mapping, changing, or swapping a logical address (LA0=GLPN0 or LA0=1LPN0) of the first storage region 16 of the first user data region 14 of the first memory region 10 with a logical address (LA101=GLPN203 or LA101=2LPN101) of a third storage region 36 of the second over-provisioning region 22 of the second memory region 20.

The controller 310 may map a logical address (e.g., LA0) of a wear leveling source block (e.g., a block with a high wear-count) of the first scale-out storage device 410-1 or a storage region (e.g., 16) of the wear leveling source block onto a logical address (e.g., LA101) of a hidden destination block (e.g., a block with a low wear-count) of the second scale-out storage device 430-1 or a storage region (e.g., 36) of the hidden destination block. For example, the storage region (e.g., 36) may be present in the second over-provisioning region 22.

FIG. 14 is an exemplary embodiment of the swap mapping table for the logical address swap operation. Referring to FIGS. 9, 10, and 14, the first core 411-1 may compare a wear-out count of each of blocks included in a memory cell array of at least one NAND-type flash memory device NAND managed by the first core 411-1 with a reference wear-out count in response to a first request REQ1 or by itself, search a block(s) having a higher count than the reference wear-out count according to a result of the comparison, and generate a first list LIST1 according to a result of the search (S103-1 or S103-1A). The first core 411-1 may transmit the first list LIST1 to the controller 310 (S105-1 or S105-1A). The first list LIST1 may be stored in the volatile memory 413-1 and/or at least one NAND-type flash memory device NAND connected to the first core 411-1 under the control of the first core 411-1.

The second core 431-1 may compare a wear-out count of each of blocks OBlock#0 to OBlock#3 included in the second over-provisioning region 22 of the at least one NAND-type flash memory device NAND managed by the second core 431-1 with a reference wear-out count in response to a second request REQ2 or by itself, search a block(s) having a lower count than the reference wear-out count according to a result of the comparison, and generate a second list LIST2 according to a result of the search (S103-2 or S103-2A). The second core 431-1 may transmit the second list LIST2 to the controller 310 (S105-2 or S105-2A). The second list LIST2 may be stored in the volatile memory 433-1 and/or at least one NAND-type flash memory device NAND connected to the second core 431-1 according to a control of the second core 431-1.

The CPU 330 of the controller 310 may receive the first list LIST1 and the second list LIST2, generate a mapping table TB4 as shown in FIG. 14 based on the lists LIST1 and LIST2, and store the mapping table TB4 in the volatile memory 360 (S107). For example, the mapping table TB4 may be at least a portion of a table TABLE1.

When the logical address LA0=GLPN0 or LA0=1LPN0 is a logical address for a program (or write) operation, as shown in CASE2, the controller 310 may write program data output from the host 200 in a first page OPage#0 or 36 of the first block Block#0 of the second provision region 22 of a third storage region, e.g., the second memory region 20, designated by the physical address 2PPN101 corresponding to the logical address LA101=GLPN203=203 or LA101=2LPN101 shown in FIG. 14.

That is, the controller 310 may program the program data in the third storage region OPage#0 or 36 of the second memory region 20 instead of the first storage region Page#0 or 16 of the first memory region 10. Accordingly, a valid page of the second memory region 20 may be increased.

When imbalance in performance occurs between the clusters 410 and 430 or between the scale-out storage devices 410-1 and 430-1 included in the data storage device 300 or 300A, the controller 310 may control a size of each of the over-provisioning regions 12 and 22 so as to control or remove the imbalance in performance.

For example, when performance of the first scale-out storage device 410-1 is relatively lower than performance of the second scale-out storage device 430-1, the controller 310 may move or migrate cold data stored in the first storage region 16 of the first memory region 10 to the third storage region 36 of the second memory region 20. Accordingly, the first over-provisioning region 12 of the first memory region 10 of the first scale-out storage device 410-1 may be increased and the performance of the first scale-out storage device 410-1 may be increased.

As another exemplary embodiment, when the performance of the first scale-out storage device 410-1 is relatively lower than the performance of the second scale-out storage device 430-1, the controller 310 may move or migrate hot data stored in the first storage region 16 of the first memory region 10 to the third storage region 36 of the second memory region 20 using the cores 411-1 and 431-1. Accordingly, workload of the first scale-out storage device 410-1 may be dispersed to the second scale-out storage device 430-1, and thereby the performance of the first scale-out storage device 410-1 may be increased.

When the performance of the second scale-out storage device 430-1 is relatively lower than the performance of the first scale-out storage device 410-1, the controller 310 may move cold data or hot data stored in the second user data region 24 of the second memory region 20 to the first over-provisioning region 12 of the first memory region 10 using the cores 411-1 and 431-1.

The hot data are data relatively frequently accessed by the host 200 or the controller 310, and the cold data are data relatively less frequently accessed by the host 200 or the controller 310.

As described above, when at least one of durability (lifetime or lifespan) and performance of the first scale-out storage device 410-1 is different from at least one of durability and performance of the second scale-out storage device 430-1, the controller 310 may swap a logical address of a storage region for storing hot data with a logical address of a storage region for storing cold data, or swap the hot data with the cold data using mapping table described referring to FIGS. 11 and 14. In such methods, a variation in performance and/or durability (lifetime or lifespan) between the scale-out storage devices 410-1 and 430-1 can be removed.

Figure 15:
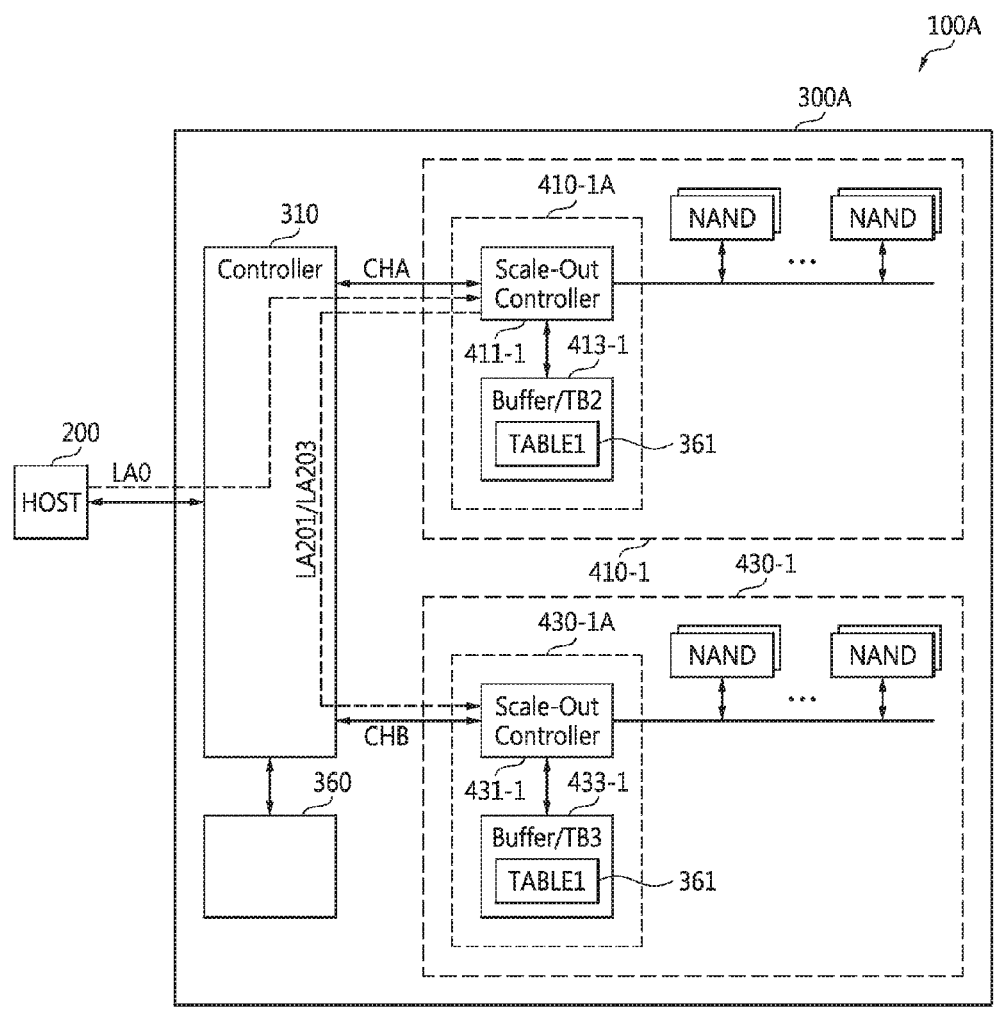
FIG. 15 is a conceptual diagram which describes an operation of the data storage device when the swap mapping table is included in the scale-out storage device.

FIG. 15 is a conceptual diagram which describes an operation of the data storage device when the swap mapping table is included in the scale-out storage device. A mapping table TB1 or TB4 described referring to FIGS. 11 and 14 may be stored in a buffer 360, e.g., DRAM, used by the controller 310 as shown in FIGS. 8A and 8B. Each mapping table TB1 or TB4 may be a portion or all of a mapping table TABLE1. However, the mapping table TB1 or TB4 described referring to FIGS. 11 and 14 may be stored in each of the volatile memories 413-1 and 433-1 managed by each of the scale-out controllers 411-1 and 431-1.

In the present specification, it is shown that each of the mapping tables TB1 to TB4 is stored in a volatile memory 360, 413-1, or 433-1 outside each of the mapping tables TB1 to TB4; however, each of the mapping tables TB1 to TB4 may be stored in a volatile memory 315 or 425 inside the controller 310, 411-1, or 431-1.

Referring to FIG. 15, the mapping table (TB1 or TB4, collectively "TABLE1") described referring to FIGS. 11 and 14 may be stored in the volatile memory 413-1 and 433-1. Each of the scale-out controllers (or each of the cores 411-1 and 431-1) may generate each of the lists LIST1 and LIST2 to be described referring to FIG. 9 or 10, and store the mapping table TB1 or TB4 (collectively "TABLE1") in the volatile memories 413-1 and 433-1 using each of the lists LIST1 and LIST2.

The volatile memory 413-1 may store the logical address-physical address mapping table TABLE2=TB2 shown in FIG. 12, and a volatile memory 433-1 may store the logical address-physical address mapping table TABLE3=TB3 shown in FIG. 12.

For example, the first scale-out controller 411-1 may transmit the first list LIST1 to the second scale-out controller 431-1 through the controller 310 or a dedicated line. Moreover, the second scale-out controller 431-1 may transmit the second list LIST2 to the first scale-out controller 411-1 through the controller 310 or the dedicated line.

Referring to FIGS. 8B to 15, when a logical address LA0 is a logical address for a program (or write) operation, the controller 310 may transmit the logical address LA0 and program data output from the host 200 to the first scale-out controller 411-1 through the first main channel CHA.

The first scale-out controller 411-1 may change the logical address LA0 to a swapped logical address LA201=GLPN201 or LA201=2LPN100 using the mapping table TABLE1=TB1 stored in the volatile memory 413-1 and output the swapped logical address LA201=GLPN201 or LA201=2LPN100 to the second scale-out controller 431-1 through the controller 310 or the dedicated line. At this time, the first scale-out controller 411-1 may output the program data output from the host 200 to the second scale-out controller 431-1 through the controller 310 or the dedicated line.

The second scale-out controller 431-1 may convert the logical address LA201=GLPN201 or LA201=2LPN100 into the physical address 2PPN100 referring to (or using) the mapping table TB3 stored in the volatile memory 433-1, and program the program data transmitted from the first scale-out controller 411-1 in the second storage region 26 corresponding to the physical address 2PPN100.

When the logical address LA0 is a logical address for a read operation, the controller 310 may transmit the logical address LA0 output from the host 200 to the first scale-out controller 411-1 through the first main channel CHA.

The first scale-out controller 411-1 may output the swapped logical address LA201=GLPN201 or LA201=2LPN100 corresponding to the logical address LA0 to the second scale-out controller 431-1 through the controller 310 or the dedicated line.

The second scale-out controller 431-1 may convert the logical address LA201=GLPN201 or LA201=2LPN100 into the physical address 2PPN100 referring to (or using) the mapping table TB3 stored in the volatile memory 433-1, read data from the second storage region 26 corresponding to the physical address 2PPN100, and transmit the read data to the controller 310 through a second main channel CHB. The controller 310 may transmit data output from the second storage region 26 to the host 200.

When the logical address LA0 is a logical address for a program (or write) operation, the controller 310 may transmit the logical address LA0 and the program data output from the host 200 to the first scale-out controller 411-1 through the first main channel CHA.

The first scale-out controller 411-1 may change the logical address LA0 to a mapped logical address LA203=GLPN203 or LA203=2LPN101 using a mapping table TABLE1=TB4 stored in the volatile memory 413-1 and output the logical address LA203=GLPN203 or LA203=2LPN101 to the second scale-out controller 431-1 through the controller 310 or the dedicated line. At this time, the first scale-out controller 411-1 may output the program data output from the host 200 to the second scale-out controller 431-1 through the controller 310 or the dedicated line.

The second scale-out controller 431-1 may convert the logical address LA203=GLPN203 or LA203=2LPN101 into the physical address 2PPN101 with reference to (or using) the mapping table TB3 stored in the volatile memory 433-1 and program the program data transmitted from the first scale-out controller 411-1 in the third storage region 36 corresponding to the physical address 2PPN101.

When the logical address LA0 is a logical address for a read operation, the controller 310 may transmit the logical address LA0 output from the host 200 to the first scale-out controller 411-1 through the first main channel CHA.

The first scale-out controller 411-1 may output the mapped logical address LA201=GLPN203 or LA203=2LPN101 corresponding to the logical address LA0 to the second scale-out controller 431-1 through the controller 310 or the dedicated line using the mapping table TABLE1=TB4 stored in the volatile memory 413-1.

The second scale-out controller 431-1 may convert the logical address LA203=GLPN203 or LA203=2LPN101 into the physical address 2PPN101 with reference to the mapping table TB3 stored in the volatile memory 433-1, read data from the third storage region 36 corresponding to the physical address 2PPN101, and transmit the read data to the controller 310 through the second main channel CHB. The controller 310 may transmit the data output from the third storage region 36 to the host 200.

Figure 16:
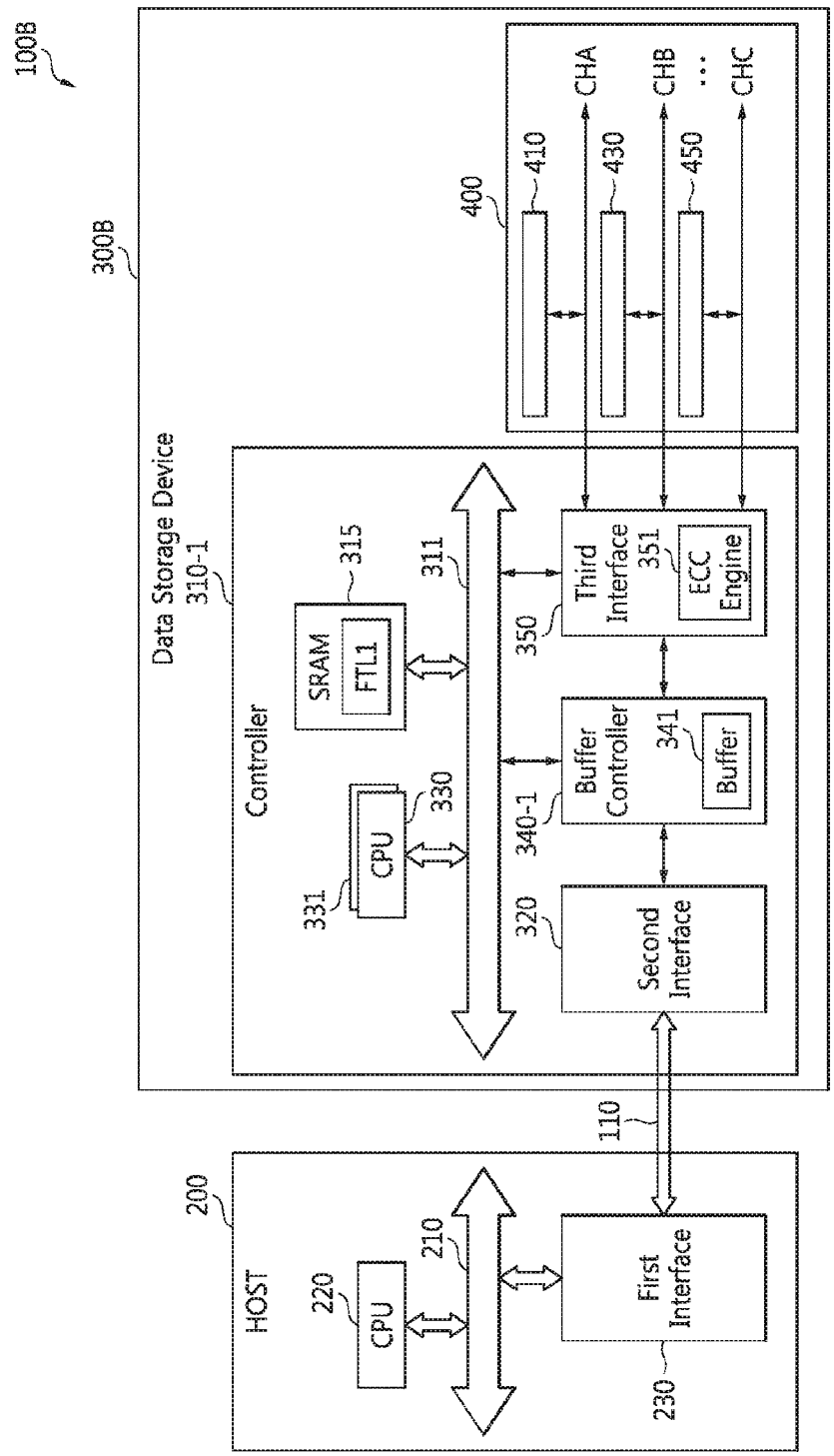
FIG. 16 is a block diagram which shows a data processing system according to some exemplary embodiments of the present inventive concept.

FIG. 16 is a block diagram that illustrates a data processing system according to some exemplary embodiments of the present inventive concept. Referring to FIGS. 1 to 16, a data processing system 100B may include the host 200 and a DRAM-less data storage device 300B. For example, the data processing system 100B may be embodied as a tablet PC or an eMMC. The DRAM-less data storage device 300B may include a controller 310-1 and the memory cluster 400.

The buffer controller 340-1 does not perform data processing on an external buffer or an external DRAM. During a write operation or a read operation, the buffer controller 340-1 may transmit data to a second interface 320 or a third interface 350 using an internal buffer 341. Except for an operation of the buffer controller 340-1, the controller 310-1 of FIG. 16 is substantially the same as or similar to the controller 310 of FIG. 1 in structure and operation, such that a specific description on the controller 310-1 will be omitted.

Figure 17:
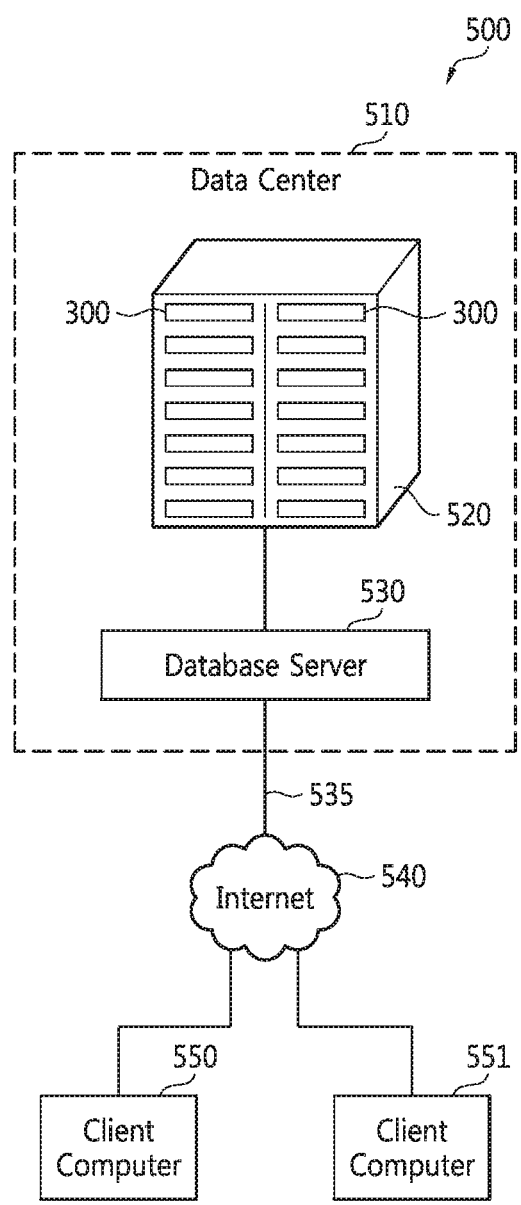
FIG. 17 is a block diagram which shows a data processing system according to some exemplary embodiments of the present inventive concept.

FIG. 17 is a block diagram which shows a data processing system according to some exemplary embodiments of the present inventive concept. Referring to FIGS. 1 to 17, a data processing system 500 may include a database 520, a database server 530, a second network 540, and a plurality of client computers 550 and 551. A data center, an internet data center, or a cloud data center 510 may include the database 520 and the database server 530.

The database 520 may include a plurality of data storage devices 300, 300A, or 300B (collectively "300"). The plurality of data storage devices 300 may be installed in a rack. A structure and an operation of each data storage device 300 are substantially the same as or similar to the structure and the operation of the data storage device 300 described referring to FIGS. 1 to 16.

The database server 530 may control an operation of each of the plurality of data storage devices 300. For example, the database server 530 may perform a function of the host 200 shown in FIG. 1. The database server 530 may be connected to a second wireless network 540, e.g., the internet or Wi-Fi, through a first network 535, e.g., Local Area Network (LAN). Each of the plurality of client computers 550 and 551 may be connected to the database server 530 through the second network 540.

Figure 18:
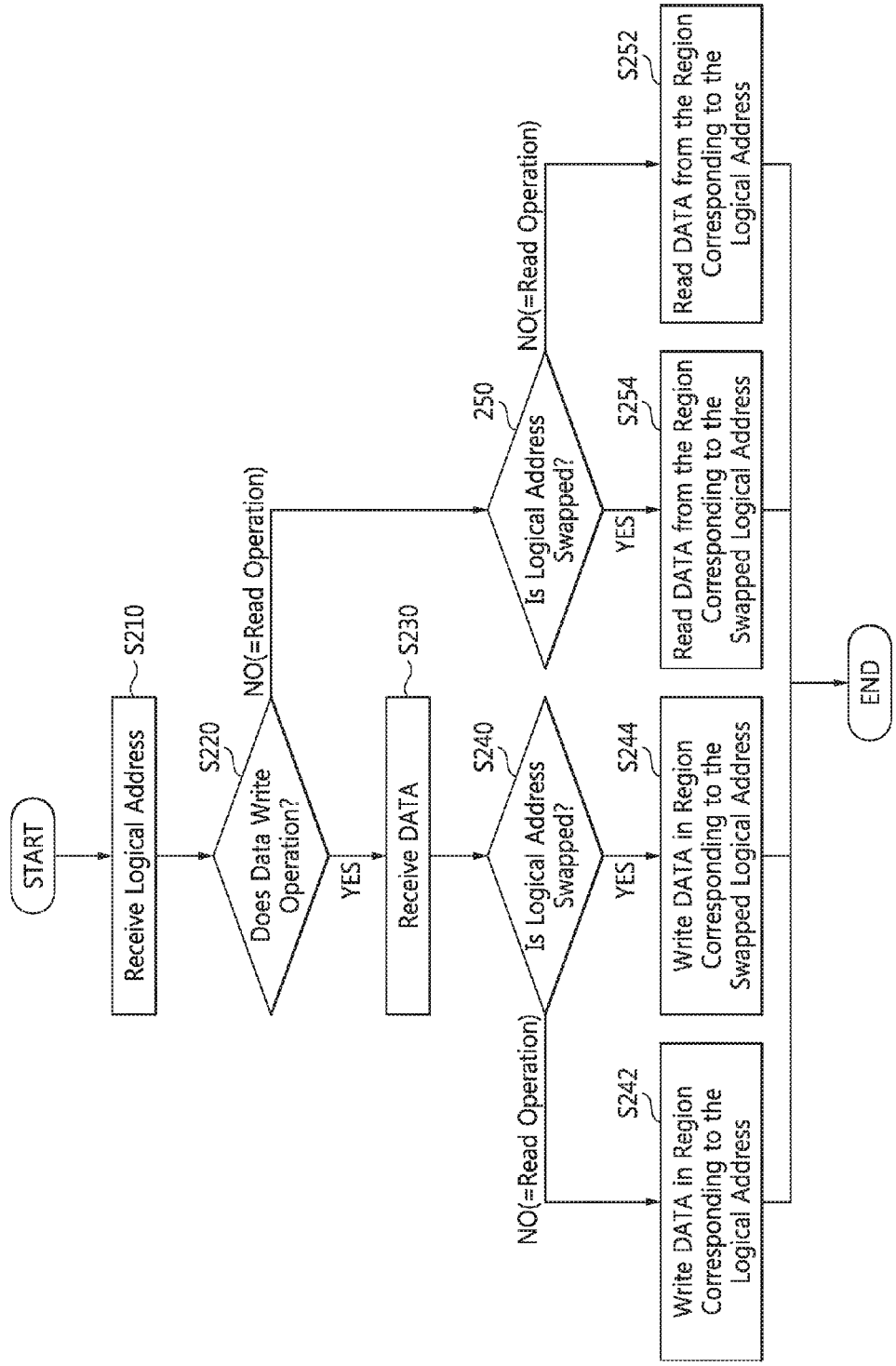
FIG. 18 is a flow chart which illustrates an operation of the data storage device shown in FIG. 8A or 8B.

FIG. 18 is a flow chart that illustrates an operation of the data storage device shown in FIG. 8A or 8B. Referring to FIGS. 8A to 18, the controller 310 may receive a logical address from the host 200 (S210). When the logical address is a logical address for a write operation (YES in S220), the controller 310 may receive data DATA from the host 200 (S230).

As shown in FIG. 8A, when each of the logical addresses LA0 and LA100 is not swapped (NO in S240), each of the scale-out controllers 411-1 and 431-1 may program (or write) each of the data DATA in each region corresponding to each of the logical addresses LA0 and LA100 (S242). However, as shown in FIG. 8B, when the logical addresses are swapped (YES in S240), the scale-out controller 431-1 may program data DATA in a region (for example, 26 or 36 of FIG. 13) corresponding to a swapped logical address using the mapping table (TB1 of FIG. 11 or TB4 of FIG. 14) (S244).

When the logical address output from the host 200 is a logical address for a read operation (NO in S220), the controller 310 may determine whether or not the logical addresses are swapped (S250).

As shown in FIG. 8A, when each of the logical addresses LA0 and LA100 is not swapped (NO in S250), each of the scale-out controllers 411-1 and 431-1 may read data from each region corresponding to each of the logical addresses LA0 and L100, and output the data to the controller 310 (S252). The controller 310 may output the data to the host 200.

However, as shown in FIG. 8B, when the logical addresses are swapped (YES in S250), the scale-out controller 431-1 may read data from a region (for example, 26 or 36) corresponding to a swapped logical address using a mapping table (TB1 of FIG. 11 or TB4 of FIG. 14), and output the data to the controller 310 (S254). The controller 310 may output the data to the host 200.

Overall durability (or lifetime or lifespan) and overall performance of a data storage device including scale-out storage devices according to some exemplary embodiments of the present inventive concept can be improved.

Since a logical address of a source block can be swapped with a logical address of a destination block based on a wear-count of each of memory chips included in each of scale-out storage devices or a wear-count of each of blocks included in the memory chip, the data storage device can perform global wear leveling among the scale-out storage devices.

Since a logical address of a source block can be swapped with a logical address of a destination block based on a wear-count of each of memory chips included in each of scale-out storage devices or a wear-count of each of blocks included in the memory chip, the data storage device can uniformly control performance and durability (or lifetime or lifespan) of each of the scale-out storage devices.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data storage device comprising:
a first multi-chip set including a first volatile memory, a first non-volatile memory, and a first core configured to control the first volatile memory and the first non-volatile memory and compare a wear-count of each storage region in the first non-volatile memory device with a reference wear-out count;
a second multi-chip set including a second volatile memory, a second non-volatile memory, and a second core configured to control the second volatile memory and the second non-volatile memory; and
a third multi-chip set including a third volatile memory, a third non-volatile memory, and a third core configured to control the third volatile memory and the third non-volatile memory;
a controller connected to the first multi-chip set and the second multi-chip set, and configured to swap a first logical address of a first storage region of the first non-volatile memory with a second logical address of a second storage region of the second non-volatile memory when the first storage region has higher wear-count than the reference wear-out count based on a result of the comparison, and
a memory configured to store a table including the first logical address and the second logical address swapped with each other by the controller,
wherein the controller is configured to receive the first logical address from a host and transmit the swapped second logical address to the second multi-chip set by referring to the table, and
wherein the first and the third non-volatile memory device is configured to store a user data and the second non-volatile memory device is an over-provision region.

2. The data storage device of claim 1, wherein the controller is configured to swap first data stored in the first storage region with second data stored in the second storage region.

3. The data storage device of claim 1, wherein a wear-count of the first storage region is higher than a wear-count of the second storage region.

4. The data storage device of claim 3, wherein the wear-count is based upon at least one of an erase count, a program count, a read count, a bad block occurrence number, and a read error occurrence number.

5. The data storage device of claim 1, wherein the first storage region is a region for storing one of hot data and cold data, and the second storage region is a region for storing the other of the hot data and the cold data.

6. The data storage device of claim 1, wherein the first volatile memory and the first core are included in a first semiconductor package, and the second volatile memory and the second core are included in a second semiconductor package.

7. The data storage device of claim 1, wherein the controller is configured to receive the first logical address through a first channel from the first core according to a first request of the controller, and receive the second logical address through a second channel from the second core according to a second request of the controller.

8. The data storage device of claim 1, wherein each of the first volatile memory and the second volatile memory is a dynamic random access memory (DRAM), each of the first non-volatile memory and the second non-volatile memory is a flash memory, and the data storage device is a solid state drive (SSD).

9. The data storage device of claim 1, wherein the controller is configured to swap a third logical address of a third storage region of the third non-volatile memory with a second logical address of a second storage region of the second non-volatile memory when the third storage region has higher wear-count than the reference wear-out count based on a result of the comparison.

10. A method of operating a data storage device comprising a first multi-chip set including a first volatile memory, a first non-volatile memory, and a first core configured to control the first volatile memory and the first non-volatile memory, and a second multi-chip set including a second volatile memory, a second non-volatile memory, and a second core configured to control the second volatile memory and the second non-volatile memory, and a controller connected to the first multi-chip set and the second multi-chip set, the method comprising:

receiving program request with a first logical address and data from a host, with the first core, comparing a wear-count of each of storage regions included in the first non-volatile memory with a reference wear-count and determine whether each of storage region has higher wear-count than the reference wear-count, with the controller, swapping the first logical address of each of the storage regions of the first non-volatile memory with a second logical address of second storage regions of the second non-volatile memory when the storage region has higher wear-count than the reference wear-out count based on a result of the comparison.

11. The method of claim 10, wherein the controller provides the second storage region in the second non-volatile memory device with the data.

12. The method of claim 10, further comprising storing a table, in a memory, including the first logical address and the second logical address swapped with each other by the controller.

13. The method of claim 12, wherein the controller transmits the swapped second logical address to the second multi-chip set by referring to the table.

14. The method of claim 10, wherein the wear-count is based upon at least one of an erase count, a program count, a read count, a bad block occurrence number, or a read error occurrence number.

15. The method of claim 10, wherein the first storage region is a region for storing one of hot data and cold data, and the second storage region is a region for storing the other of the hot data and the cold data; wherein hot data is more frequently accessed relative to the cold data.

16. The method of claim 10, wherein the first volatile memory and the first core are included in a first semiconductor package, and the second volatile memory and the second core are included in a second semiconductor package.

17. The method of claim 16, wherein each of the first semiconductor package and the second semiconductor package is a multi-chip package (MCP).

18. The method of claim 10, wherein the first multi-chip set and the controller are embodied in one semiconductor package.

19. The method of claim 10, wherein the semiconductor package is an embedded package on package (ePOP).

20. The method of claim 10, wherein the controller receives the first logical address through a first channel from the first core according to a first request of the controller, and receives the second logical address through a second channel from the second core according to a second request of the controller.

21. The method of claim 10, wherein each of the first storage region and the second storage region is a block or a page.

22. The method of claim 10, wherein each of the first volatile memory and the second volatile memory is a dynamic random access memory (DRAM), each of the first non-volatile memory and the second non-volatile memory is a flash memory, and the data storage device is a solid state drive (SSD).

23. A data storage device comprising:

a first multi-chip set including a first volatile memory, a first non-volatile memory, and a first core configured to control the first volatile memory and the first non-volatile memory and compare a wear-count of each storage region in the first non-volatile memory device with a reference wear-out count;

a second multi-chip set including a second volatile memory, a second non-volatile memory, and a second core configured to control the second volatile memory and the second non-volatile memory and compare a wear-count of each storage region in the first non-volatile memory device with the reference wear-out count;

a third multi-chip set including a third volatile memory, a third non-volatile memory, and a third core configured to control the third volatile memory and the third non-volatile memory;

a controller connected to the first multi-chip set, the second multi-chip set and a third multi-chip set, and configured to swap a first logical address of a first storage region of the first non-volatile memory with a second logical address of a second storage region of the second non-volatile memory when the first storage region has higher wear-count than the reference wear-out count based on a result of the comparison by the first core and the second storage region has lower wear-count than the reference wear-out count by the second core, and a memory configured to store a table including the first logical address and the second logical address swapped with each other by the controller, wherein the controller is configured to receive the first logical address from a host and transmit the swapped second logical address to the second multi-chip set by referring to the table, and wherein the first and the second non-volatile memory device is configured to store a user data and the third non-volatile memory device is an over-provision region.

* * * * *